US008028244B2

(12) United States Patent
Takahashi et al.

(10) Patent No.: US 8,028,244 B2
(45) Date of Patent: Sep. 27, 2011

(54) STATUS PROCESSING SYSTEM, STATUS PROCESSOR, AND STATUS DISPLAYING METHOD

(75) Inventors: Yusaku Takahashi, Obu (JP); Fumitoshi Uno, Okazaki (JP); Tomoki Nakamura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 754 days.

(21) Appl. No.: 12/035,302

(22) Filed: Feb. 21, 2008

(65) Prior Publication Data

US 2009/0217169 A1 Aug. 27, 2009

(51) Int. Cl.
*G06F 3/048* (2006.01)

(52) U.S. Cl. .......................... 715/772; 715/733; 709/201

(58) Field of Classification Search .................. 715/772, 715/733; 709/201
See application file for complete search history.

(56) References Cited

U.S. PATENT DOCUMENTS

| | | | | |
|---|---|---|---|---|
| 6,839,147 | B1 * | 1/2005 | Umebayashi | 358/1.15 |
| 7,383,328 | B2 * | 6/2008 | Iyoki | 709/222 |
| 7,664,902 | B1 * | 2/2010 | Chow et al. | 710/301 |
| 2003/0043647 | A1 * | 3/2003 | Kanamori et al. | 365/200 |
| 2005/0045721 | A1 | 3/2005 | Wang et al. | |
| 2005/0050111 | A1 * | 3/2005 | Sensnovis | 707/203 |
| 2005/0086397 | A1 * | 4/2005 | Huffman et al. | 710/15 |
| 2005/0240713 | A1 * | 10/2005 | Wu et al. | 710/314 |
| 2006/0171683 | A1 * | 8/2006 | Battaglia et al. | 386/107 |
| 2006/0174054 | A1 | 8/2006 | Matsuki | |
| 2007/0024653 | A1 | 2/2007 | Kim | |
| 2007/0058832 | A1 * | 3/2007 | Hug et al. | 381/388 |
| 2007/0168603 | A1 * | 7/2007 | Takai et al. | 711/113 |
| 2007/0168605 | A1 * | 7/2007 | Takai et al. | 711/113 |
| 2007/0168614 | A1 * | 7/2007 | Luo et al. | 711/115 |
| 2007/0226401 | A1 * | 9/2007 | Huang et al. | 711/103 |
| 2007/0242668 | A1 * | 10/2007 | Barrett | 370/390 |
| 2008/0059702 | A1 * | 3/2008 | Lu et al. | 711/115 |
| 2008/0141044 | A1 * | 6/2008 | Abiko et al. | 713/193 |
| 2008/0141045 | A1 * | 6/2008 | Abiko et al. | 713/193 |
| 2008/0209006 | A1 | 8/2008 | Nakamura et al. | |

FOREIGN PATENT DOCUMENTS

| | | | |
|---|---|---|---|
| EP | 02056202 | A | 7/2002 |
| JP | H09-006558 | A | 10/1997 |
| JP | 2003-177987 | A | 6/2003 |
| JP | 2006-178633 | A | 7/2006 |
| JP | 2006-209662 | A | 8/2006 |

OTHER PUBLICATIONS

Japanese Patent Office, Office Action for Japanese Patent Application No. 2007-035312, mailed Sep. 8, 2008.

European Search Report for Application No. EP 08250520, dated Jun. 10, 2008.

* cited by examiner

*Primary Examiner* — Chat Do
*Assistant Examiner* — William Titcomb
(74) *Attorney, Agent, or Firm* — Baker Botts L.L.P.

(57) ABSTRACT

A status processor is communicable with a host device via a network. The processor includes a media connecting unit, a status-reflecting filename setting unit, and a server unit. The media connecting unit is capable of connecting a storage media. The status-reflecting filename setting unit sets a status-reflecting filename corresponding to a status of the processor or the storage media. The server unit transmits data indicating an existence of the file having the status-reflecting filename to the host device.

13 Claims, 18 Drawing Sheets

FIG.5A

| DETECTED STATUS | CHARACTER STRING |
|---|---|
| CARD NOT CONNECTED | "A CARD IS NOT INSERTED" |
| CF CARD CONNECTED AND FUNCTIONING NORMALLY | "THE CF CARD CAN BE ACCESSED" |
| UNFORMATTED CF CARD CONNECTED | "THE CF CARD IS NOT FORMATTED" |
| SM CARD CONNECTED AND FUNCTIONING NORMALLY | "THE SM CARD CAN BE ACCESSED" |
| UNFORMATTED SM CARD CONNECTED | "THE SM CARD IS NOT FORMATTED" |
| ⋮ | ⋮ |

FIG.5B

| | |
|---|---|
| CF CARD | "CF (%M REMAINING, %M TOTAL).jpg" |
| SM CARD | "SM (%M REMAINING, %M TOTAL).jpg" |
| ⋮ | ⋮ |

STATUS PROCESSING SYSTEM, STATUS PROCESSOR, AND STATUS DISPLAYING METHOD

CROSS REFERENCE TO RELATED APPLICATION

This application is related to Japanese Patent Application No. 2007-035312 filed Feb. 15, 2007. The entire content of the related application is incorporated herein by reference.

TECHNICAL FIELD

The present invention relates to a processor for outputting a status of the processor or a storage media.

BACKGROUND

A technology for transferring files via file transfer protocol (FTP) is well known in the art (Japanese Patent Application Publication No. 2003-177987, for example)

In recent years, memory cards have become quite popular as a type of storage media. Memory cards have a nonvolatile memory, such as flash memory, in a card-like package and have rapidly become a common storage media used for storing data in digital equipment, such as digital cameras and portable music players. A variety of memory cards with no standardized specifications have appeared on the market, such as CompactFlash (registered trademark; hereinafter abbreviated as "CF"), SmartMedia (registered trademark; hereinafter abbreviated as "SM"), Memory Stick (registered trademark; hereinafter abbreviated as "MS"), and SD cards (registered trademark; hereinafter abbreviated as "SD")

These memory cards are connected to a memory card reader/writer (hereinafter abbreviated to "reader/writer") capable of reading from and writing to the memory card. A personal computer (PC) or the like capable of communicating with the reader/writer can access a memory card connected to the reader/writer. Printing devices equipped with such a reader/writer have become popular in recent years. By connecting a memory card storing an image data file saved according to the JPEG format, for example, to such a reader/writer, the printing device can directly print the images without the user of a PC.

If an FTP client program is installed on a. PC or the like, and an FTP server program is provided in the card reader, by connecting a memory card used as the destination for saving data files of photographed images for a digital camera or a cell phone with a camera function to the reader/writer, the data file saved in the memory card can be transmitted to the PC according to FTP. In other words, the reader/writer can be used with the PC as an external FTP processor.

SUMMARY

However, the FTP protocol has not been designed with the idea of the FTP server handling storage media (removable media). Therefore, when the FTP server was provided in the aforementioned FTP processor (or a printer or other peripheral device equipped with the FTP processor), the FTP server could not notify the host device about the connected status of the storage media to the media connector or the status of the storage media connected to the media connector.

For example, when a PC attempts to access an FTP processor without a connected storage media, the FTP processor cannot recognize the storage media storing files to be handled according to requests received from the PC and directories in which the files should be stored. Accordingly, the FTP processor simply outputs the response code "550" and the message "The directory cannot be changed" indicating that the request cannot be performed in FTP due to access restrictions in the file system.

However, for a general user not well versed with FTP, it is nearly impossible to understand from this code that storage media is not inserted in the media slot. Even a user who has knowledge of FTP cannot know for sure whether the problem is an access restriction or some process on the file system side.

The reason for this is merely that the conventional FTP protocol did not take into consideration the fact that the FTP server would be operating with no storage media.

Therefore, it is conceivable to expand and modify the FTP protocol itself, modifying the response code output to something that is easier to understand, but a large number of users of existing FTP clients would not be able to take advantage of this benefit. Further, any expansions or modifications to the FTP protocol would require approval through an international organization, which could be quite onerous.

Therefore, it is an object of the present invention to provide a status processor, a status processing system, and a status displaying method capable of outputting a status of the status processor or a storage media by using a protocol such as FTP.

To achieve the above and other objects, one aspect of the invention provides a status processor communicable with a host device via a network, the processor including a media connecting unit, a status-reflecting filename setting unit, and a server unit. The media connecting unit is capable of connecting a storage media. The status-reflecting filename setting unit sets a status-reflecting filename corresponding to a status of the processor or the storage media. The server unit transmits data indicating an existence of the file having the status-reflecting filename to the host device.

In another aspect of the present invention, there is provided a status processing system including a host device and a processor that is communicable with the host device via a network. The processor includes a media connecting unit, a status-reflecting filename setting unit, and a server unit. The media connecting unit is capable of connecting a storage media. The status-reflecting filename setting unit sets a status-reflecting filename corresponding to a status of the processor or the storage media. The server unit transmits data indicating an existence of the file having the status-reflecting filename to the host device.

In another aspect of the present invention, there is provided a status displaying method using a host device and a processor communicable with the host device via a network. The host device includes a display unit. The processor includes a media connecting unit that is capable of connecting a storage media. The status displaying method includes: setting a status-reflecting filename corresponding to a status of the processor or the storage media; transmitting data indicating an existence of the file having the status-reflecting filename to the host device; and displaying the data on the displaying unit.

BRIEF DESCRIPTION OF THE DRAWINGS

In the drawings:

FIGS. 5A and 5B are explanatory diagrams showing tables of status-reflecting filenames used in the embodiment;

DETAILED DESCRIPTION

A status processing system, a status processor, and a status displaying method according to embodiments of the present invention will be described while referring to the accompanying drawings. In this embodiment, the status processing system and the status processor is applied to an FTP system and an FTP processing device, respectively. While the FTP system described below has a simple structure used for illustrating the embodiments, it should be apparent this structure can be suitably modified within the scope of the invention.

Figure 1:
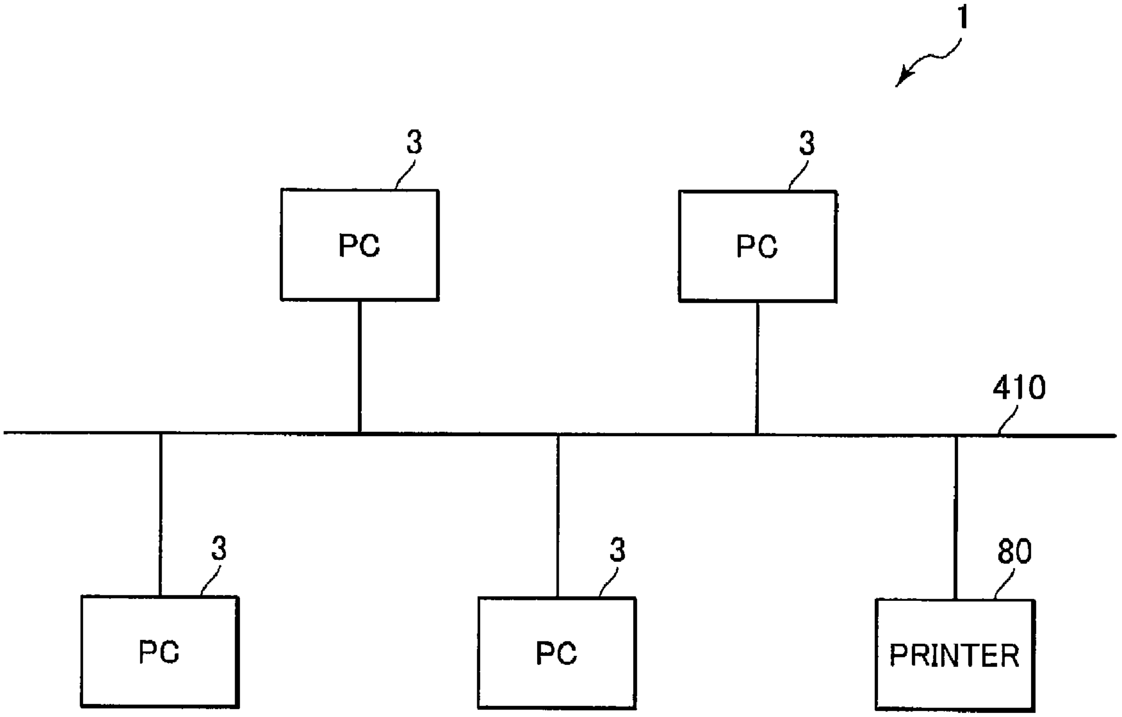
FIG. 1 is a block diagram showing an overall structure of an FTP system according to an embodiment of the present invention.

FIG. 1 is a block diagram showing an overall structure of an FTP system 1. The FTP system 1 includes a printer (the FTP processing device) 80 functioning as a network printer, a plurality of personal computers (hereinafter abbreviated as "PC") 3 serving as host devices and capable of communicating with the printer 80 via a network (LAN) 410.

The network 410 may be a wired network, as illustrated in the drawing, or a wireless network.

Figure 2:
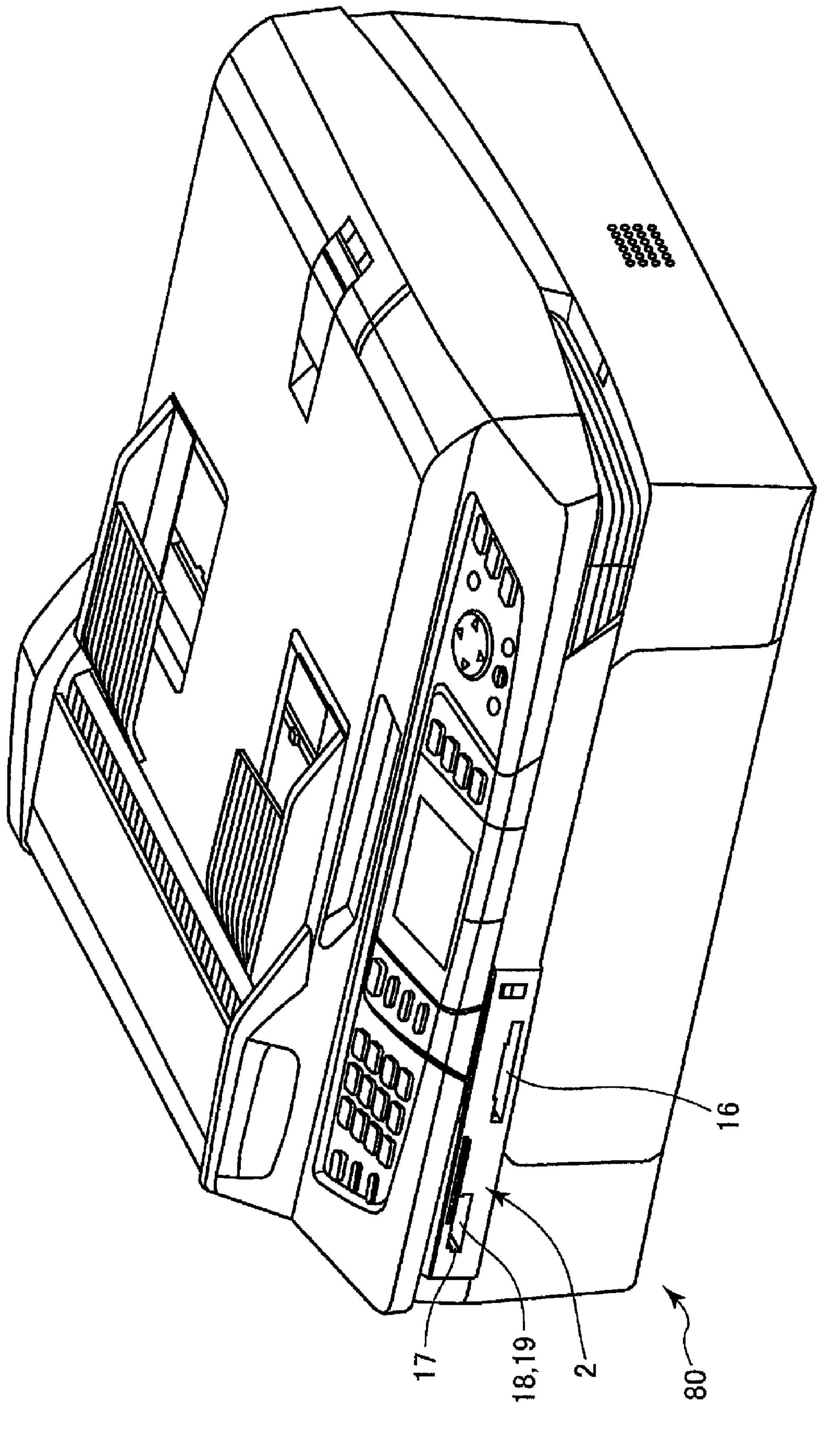
FIG. 2 is a perspective view of a printer applied to the FTP system of the embodiment.

FIG. 2 shows an outer appearance of the printer 80, which can also be referred to as a multifunction peripheral (MFP). The printer 80 is configured of a multi-reader/writer 2 incorporated in a printer and serving as an FTP processor. More specifically, the printer 80 is integrally provided with the multi-reader/writer 2 having media connection slots (hereinafter simply referred to as "slots") 16-19 exposed in a front surface of the printer 80. The printer 80 includes a printer function, scanner function, copier function, and facsimile function.

The printer 80 may include a USB connector in place of, or together with, the media connection slots, enabling USB memory to be connected to the USB connector as storage media. The printer 80 may also be provided with a wireless connector for connecting memory cards having a wireless function as storage media.

The printer 80 is connected to the PCs 3 via the network 410 and functions as a reader/writer for implementing data communications between the PCs 3 and memory cards inserted into the multi-reader/writer 2. The printer 80 also prints images and text on prescribed papers based on print data transmitted from the PCs 3. The printer 80 can also directly print images and text onto prescribed papers based on print data that the multi-reader/writer 2 reads from memory cards. The printer 80 can also transmit image data scanned by a scanning unit to the PCs 3 or copy the images read by the scanning unit using a printing unit.

The media connection slots 16-19 of the multi-reader/writer 2 shown in FIG. 2 include a first slot 16 for receiving a first memory card 11, a second slot 17 for receiving a second memory card 12, a third slot 18 for receiving a third memory card 13, and a fourth slot 19 for receiving a fourth memory card 14.

Figure 3:
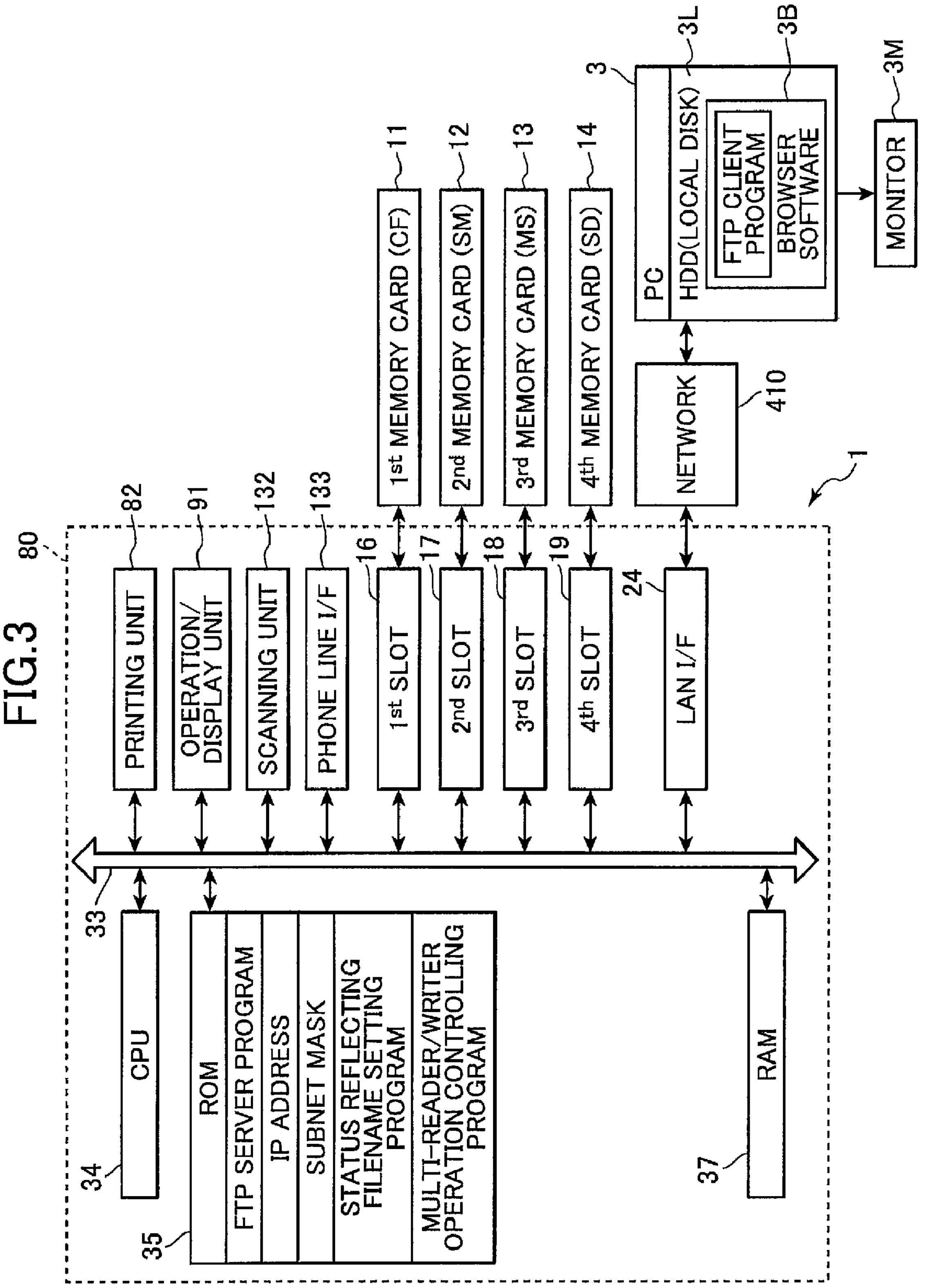
FIG. 3 is a block diagram showing an electrical structure of the printer.

FIG. 3 is a block diagram showing an electrical structure of the printer 80. The printer 80 includes a CPU 34, a ROM 35, and a RAM 37 that are connected and capable of transferring data to each other via a bus 33. The CPU 34 controls each component of the printer 80. The ROM 35 is configured of a nonvolatile memory, such as flash memory, and functions to store control programs and various data. The RAM 37 functions as a work area for the CPU 34. The slots 16-19 are connected to the bus 33 via a flash memory control LSI. The first through fourth memory cards 11-14 detachably connected to the slots 16-19 are card-type storage media, such as the CF, SM, MS, and SD described above. The card-type storage media includes flash memory storing data in a format that can be read, written, overwritten, and deleted. Each type of memory card can be selectively connected to the respective slots 16-19.

Also connected to the bus 33 are a printing unit 82, a scanning unit 132, a phone line interface 133, and an operation/display unit 91 configured of an LCD, a keyboard, cursor-moving keys, and the like. A LAN interface 24 is also connected to the bus 33 for connecting to a PC 3 functioning as a host device via a network. A plurality of PCs 3 and the printer 80 can be connected to each other via the TCP/IP network 410 (see FIG. 1).

The ROM 35 stores a control program for controlling the operations of the multi-reader/writer 2, and various other control programs for controlling printing, scanning, and fax communications, for example. The CPU 34 controls overall operations of the multifunction peripheral by executing these programs using the RAM 37 as a work area.

The ROM 35 also stores an FTP server program; an IF address and subnet mask for identifying the printer 80 on the network 410; and a program for setting a status reflecting filename.

The memory cards (storage media) 11-14 are connected to the slots 16-19. The PC 3 also includes a local disk 3L configured of a hard disk or the like, and a monitor 3M configured of a liquid crystal display or the like. A browser 3B including an FTP client program is installed on the local disk 3L.

The CPU 34 executes the various control programs described above, the program for setting the status-reflecting filename, and the FTP server program on the printer 80 in order to implement the FTP server function and status-reflecting filename setting function.

Figure 4:
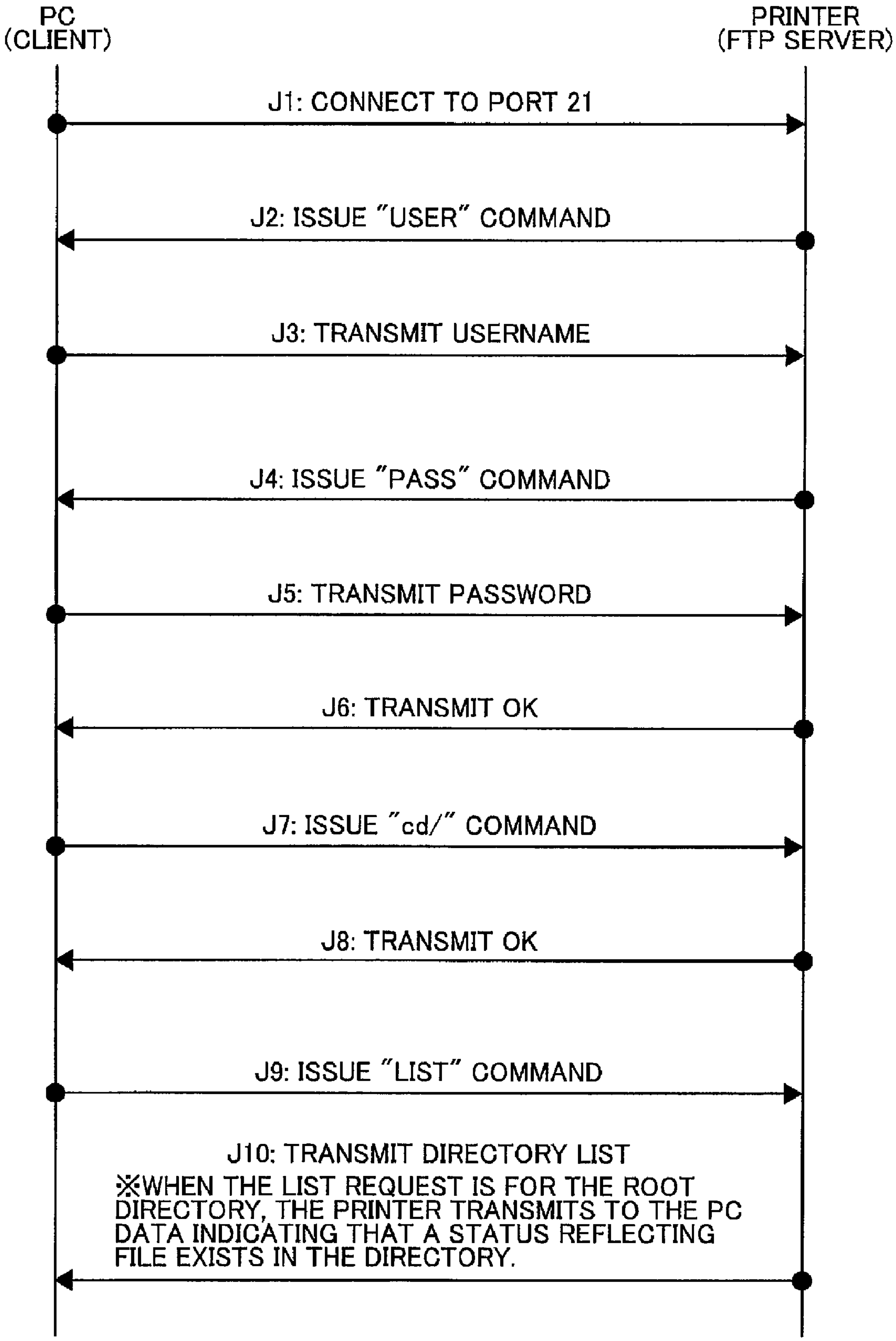
FIG. 4 is an explanatory diagram showing a sequence of operations performed in the FTP system.

Next, a sequence of data transfers on the FTP system 1 will be described with reference to FIG. 4. The sequence shown in FIG. 4 begins when the user of the PC 3 launches a browser 3B incorporated in the FTP client function and begins accessing the printer 80 when the user inputs a node name of the printer 80 "ftp://brn__600789." If a shortcut for the node name "ftp://brn__600789" is provided on the PC 3 side, the user may access the printer 80 directly by double-clicking on the shortcut to launch the browser.

First, in J1 the PC 3 (FTP client) connects to port 21 assigned to the FTP server in order to access the printer 80 (FTP server). In J2 the printer 80 transmits a username request to the PC 3. After receiving the request in J3, the PC 3 transmits the username to the printer 80 for logging in to the FTP server.

In J4 the printer 80 transmits a password request to the PC 3 and, upon receiving this password request, in J5 the PC 3 transmits a password inputted on the host device to the printer 80. The printer 80 performs user authentication for the login user based on the username and password received from the PC 3, and in J6 returns a response to the PC 3 allowing the login user to log onto the FTP server (printer 80) if authentication was accepted.

Once the user is allowed to login to the FTP server, in J7 the PC 3 issues a cd (change directory root) command to the printer 80 requesting access to the root directory. In J8 the printer 80 accesses the root directory (attempts to change the current directory to the root directory) and returns a code to the PC 3 indicating the change was successful.

If the printer 80 was unable to access the root directory, the printer 80 returns a code indicating this failure (the response code "550" and the like). However, in this embodiment, the printer 80 is configured to return a code to the PC 3 indicating that the root directory was successfully accessed, even when the storage media was not connected.

Upon receiving the code indicating that the root directory was successfully accessed, in J9 the PC 3 issues a list command for the root directory. Receiving the list command, in J10 the printer 80 transmits data to the PC 3 indicating that a file exists in the root directory. The file has a status-reflecting filename set by the program for setting the status-reflecting filename in FIG. 3. The status-reflecting filename corresponds to the status of the media connector and the status of the storage media.

FIG. 5A is an example of a character string table that the CPU 34 references when setting a filename specifying the status of the media connector and storage media. FIG. 5B is a sample table showing character strings further referenced when the storage media is formatted.

In the preferred embodiment, the printer 80 notifies the PC 3 that a file having the status-reflecting filename "exists," even when a file having the status-reflecting filename does not exist in the root directory. Upon receiving this notification, the PC 3 displays a message indicating that the file exists in the root directory based on the notification.

Figure 6A:
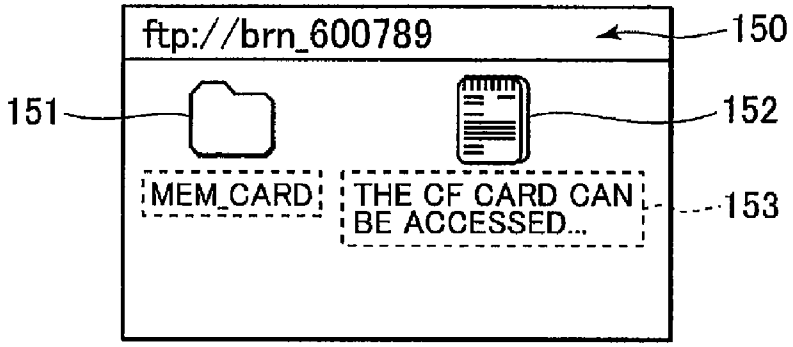
FIGS. 6A-6C are explanatory diagrams showing first icons of files displayed with status-reflecting filenames.

FIG. 6A shows an example of the status-reflecting filename displayed by the PC 3. As shown in FIG. 6A, data indicating the existence of a file having the status-reflecting filename is displayed in a window 150 of the browser. For example, if a formatted CF card is connected to the CF slot in the printer 80, a status-reflecting filename 153 set to "The CF card can be accessed" is displayed together with an icon 152. Hence, the user can easily learn the connected status of storage media in the printer 80 simply by reading data written in plain language.

Further, the user can be notified in an easy-to-understand format regarding the connected status of the storage media in the printer 80, without expanding or modifying the FTP protocol.

Figure 7:
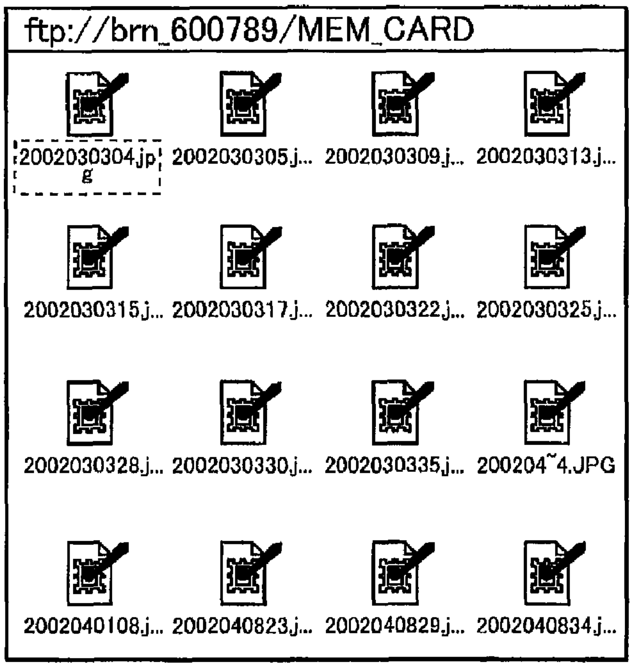
FIG. 7 is an explanatory diagram showing a list of files in a directory of a memory card.

Further, the printer 80 transmits data indicating that a directory having the directory name "MEM_CARD" exists in response to the list command described earlier. Upon receiving this data, the PC 3 displays the "MEM_CARD" directory name 151 with an icon. The printer 80 sets the directory name to that of the highest order directory in the storage media and transmits this directory name to the PC 3. When the user opens this directory 151, the printer 80 returns the filename of each file stored in the highest order directory of the storage media to the PC 3, provided that the PC 3 has requested access to this directory (specifically, when the PC 3 has transmitted "CD/MEM_CARD" and a list command in sequence). Upon receiving these filenames, the PC 3 displays icons for the files stored in the connected storage media in a window, as shown in FIG. 7.

Figure 6B:
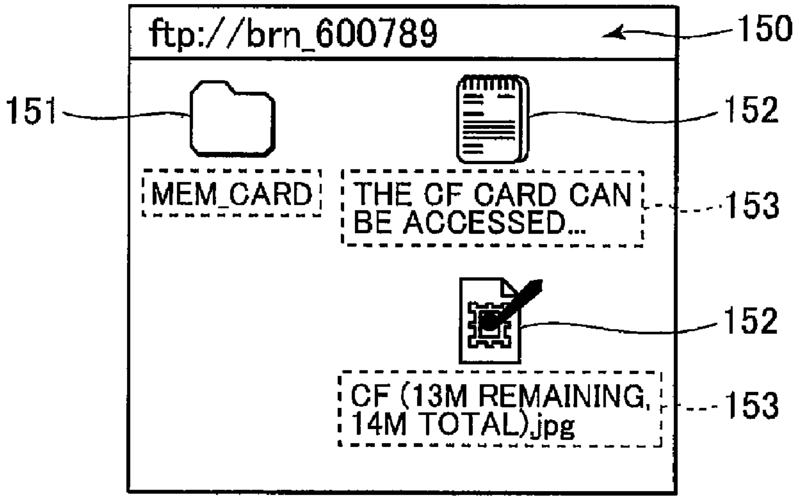

As shown in FIG. 6B, the printer 80 may transmit data to the PC 3 indicating the existence of a file with a status-reflecting filename indicating a capacity of the storage media.

Figure 6C:
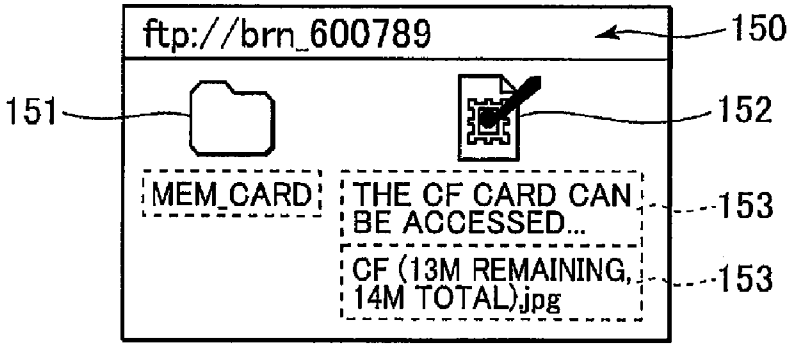

As another variation shown in FIG. 6C, the printer 80 may transmit data to the PC 3 indicating the existence of a file having a status-reflecting filename indicating both whether the storage media is connected and the capacity of the storage media.

Figure 8:
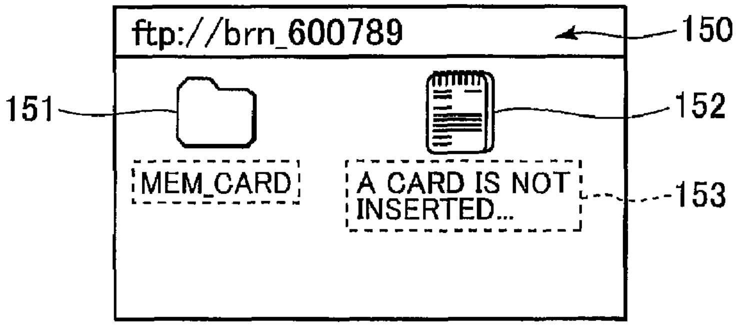
FIG. 8 is an explanatory diagram showing second icons of files displayed with status-reflecting filenames.
Figure 9:
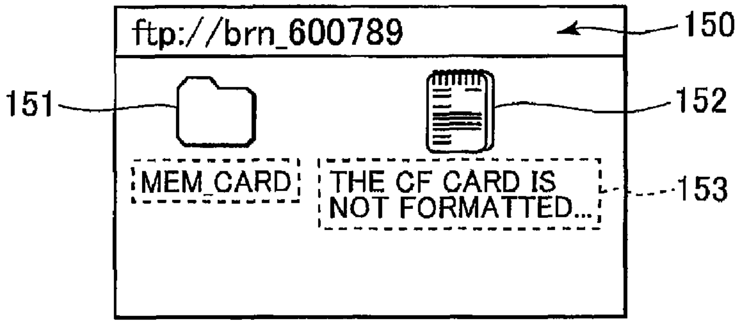
FIG. 9 is an explanatory diagram showing third icons of files displayed with status-reflecting filenames.

When storage media is not connected to any slot, the status-reflecting filename 153 is set to "Card not inserted," as shown in FIG. 8. Alternatively, if the connected storage media (a CF card, for example) is not formatted, the status-reflecting filename 153 is set to "The CF card is not formatted," as shown in FIG. 9.

Each time the PC 3 reissues the list command, the printer 80 returns data to the PC 3 indicating the existence of a file having a status-reflecting filename indicating the status of the printer 80 and the status of the storage media at that time. Hence, by reissuing the list command, the user of the PC 3 can learn the status of the storage media at the time of reissuing to accurately learn whether the connected status has changed.

Figure 10:
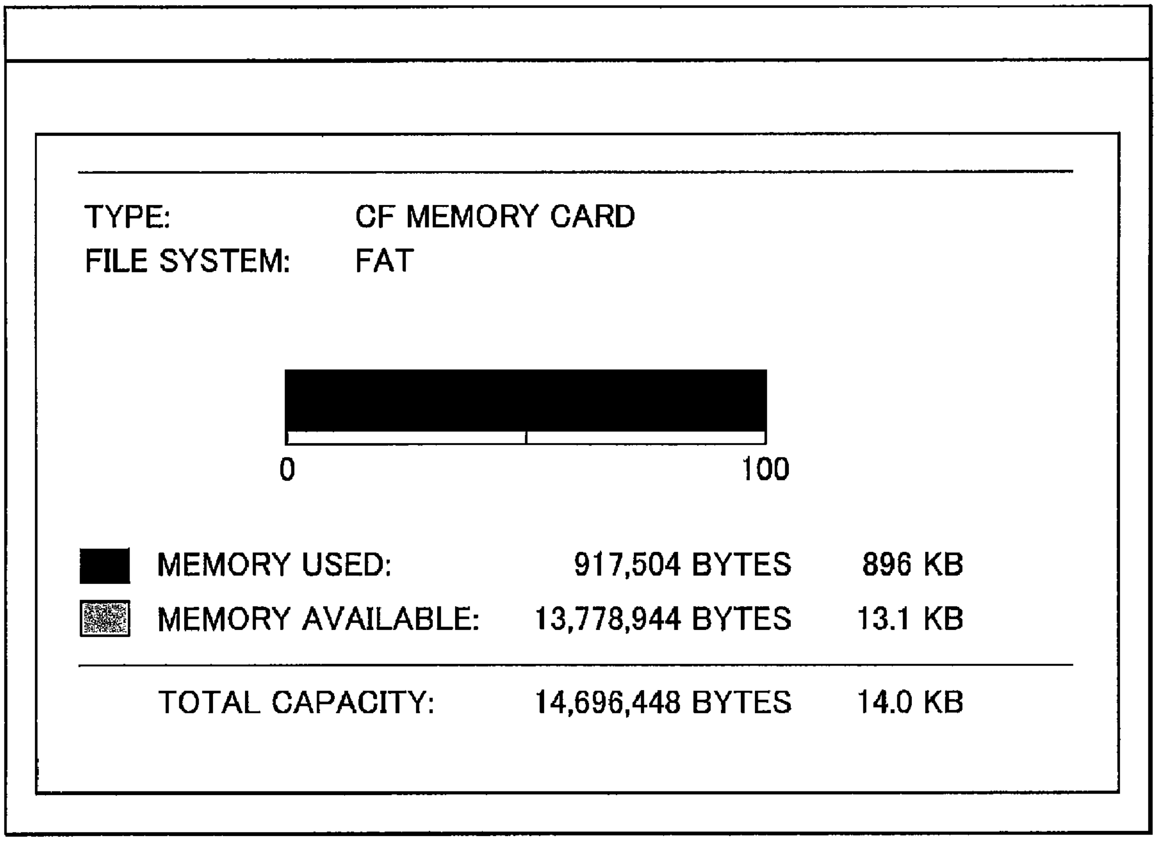
FIG. 10 is an explanatory diagram showing a display of status-reflecting data.

FIG. 10 shows the content of a file (status-reflecting data) transmitted from the printer 80 and displayed on the PC 3 when the user of the PC 3 double-clicks an icon for the file having the status-reflecting filename indicating the capacity of the storage media, as in the examples of FIG. 6B or 6C. In this way, the user can acquire more detailed data or supplemental data to the status indicated by the filename simply by browsing the displayed data.

Next, processes performed on the FTP system 1 of this embodiment will be described with reference to flowcharts and the like.

FIGS. 11 through 18 are flowcharts illustrating steps in an FTP server process that the CPU 34 of the printer 80 executes based on an FTP server program. The FTP server process begins when the printer 80 is started.

Figure 11:
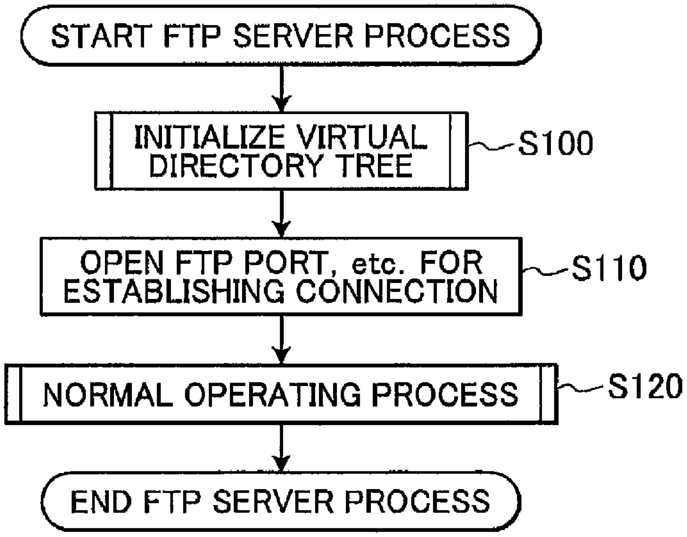
FIG. 11 is a flowchart illustrating steps in an FTP server process performed on the printer according to the embodiment.

In S100 of the FTP server process shown in FIG. 11, the CPU 34 performs a process to initialize a virtual directory tree, forming a directory tree to be managed by the CPU 34 in the FTP server process in the RAM 37 or the like. In S110 the CPU 34 performs preparations, such as opening an FTP port, in order to connect to a network device as an FTP server. In S120 the CPU 34 executes normal operating processes, as an FTP server, such as receiving requests to access files and responding to these requests. The CPU 34 continues to execute normal operating processes until the power to the printer 80 is interrupted, the printer 80 is reset, or the like.

Figure 12:
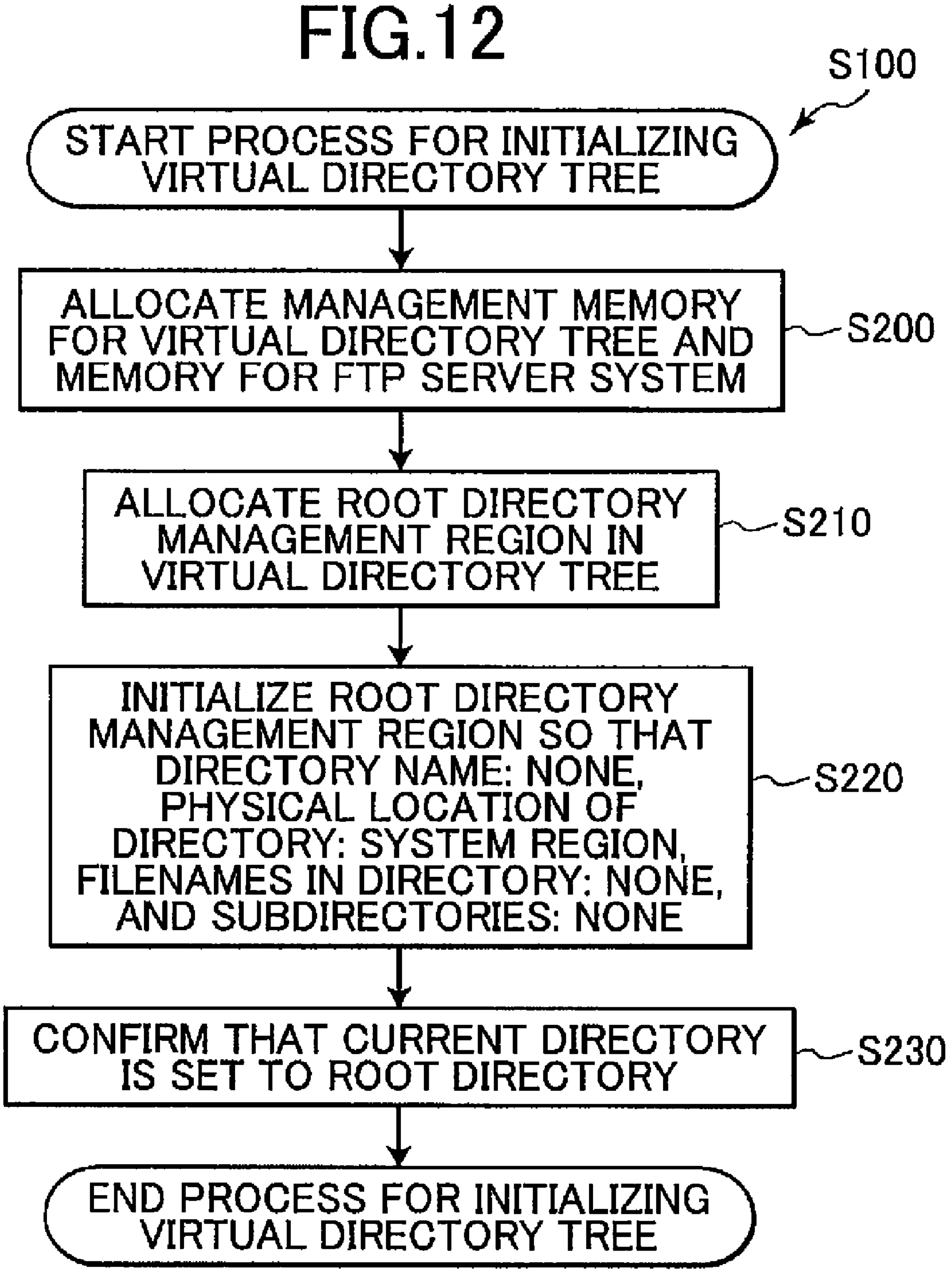
FIG. 12 is a flowchart illustrating steps in a process for initializing a virtual directory tree in the printer according to the embodiment.

FIG. 12 is a flowchart illustrating steps in the process for initializing the virtual directory tree in S110 of FIG. 11.

In S200 of FIG. 12, the CPU 34 allocates in the RAM 37 or the like an amount of memory required for managing the structure of the virtual directory tree, and an amount of memory required for managing the FTP server system.

In S210 the CPU 34 allocates a region for managing the root directory of the FTP server in the virtual directory tree formed in memory.

In S220 the CPU 34 initializes the allocated region for managing the root directory. Specifically, the CPU 34 sets attributes for the management region indicating that there is no directory name, that the physical location of the directory is in a system region described later, that there are no filenames for files stored in the directory (i.e., the directory contains no files), and that there are no subdirectories. The system region is a region of memory (the RAM 37) allocated in the process for initializing the virtual directory tree.

In S230 the CPU 34 confirms that the root directory is set as the current directory. By making this recognition, the printer 80 can return filenames for files and subdirectory names for subdirectories within the root directory, which is the current directory, when an FTP client (hereinafter simply referred to as "client") accessing the FTP server transmits a list command without specifying "cd/".

Figure 19A:
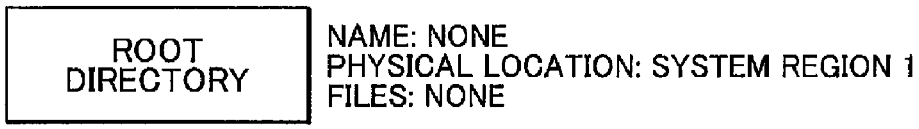
FIGS. 19A and 19B are explanatory diagrams illustrating examples of virtual directory trees according to the embodiment.

FIG. 19A is an explanatory diagram showing a virtual directory tree configured in the process for initializing the virtual directory tree described above. A conceptual drawing of the system region corresponding to the memory allocated in the process for initializing the virtual directory tree has been omitted from the drawing.

Figure 13:
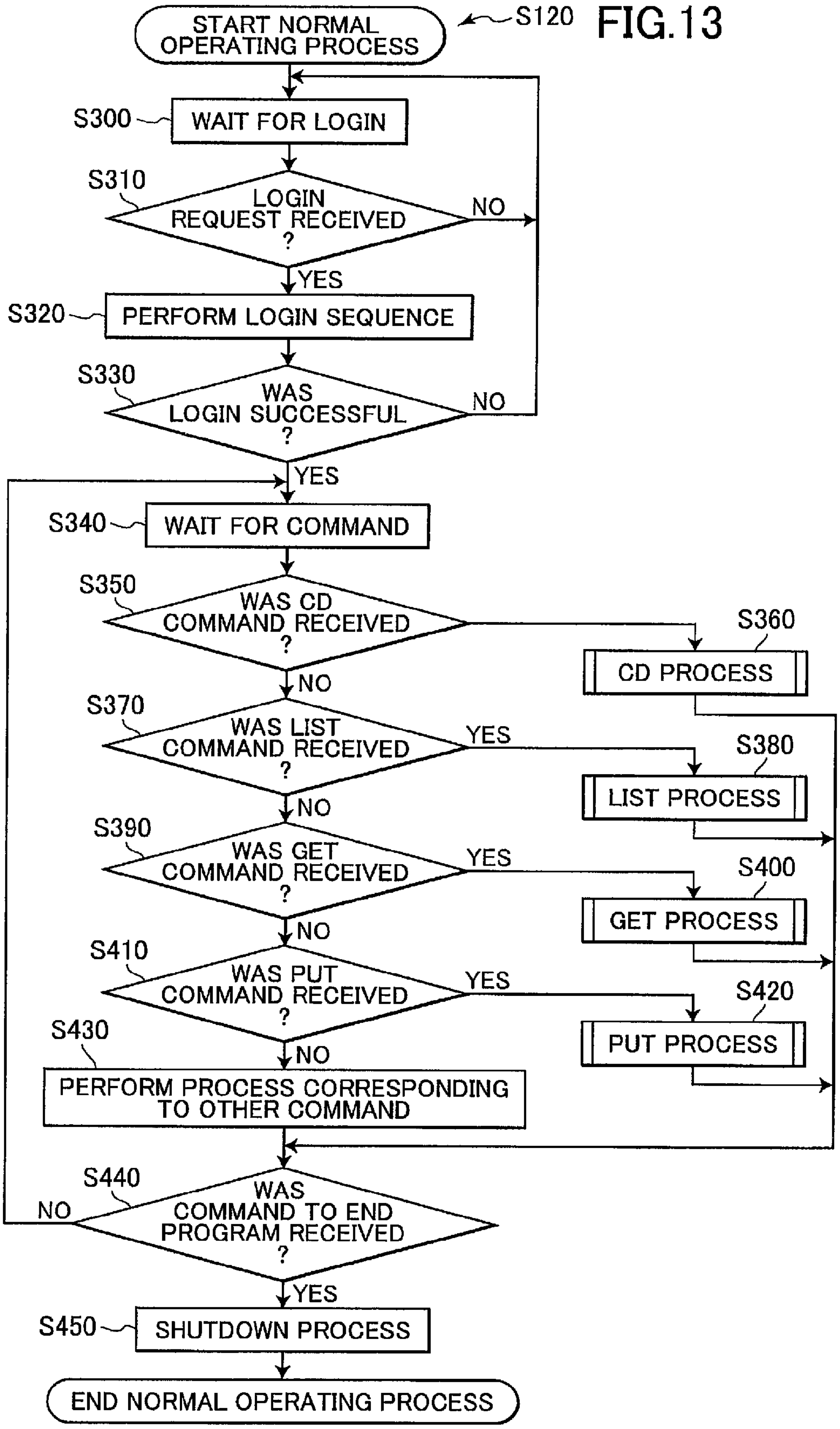
FIG. 13 is a flowchart illustrating steps in a normal operation process performed on the printer according to the embodiment.

FIG. 13 is a flowchart illustrating steps in the normal operation process of S120 in FIG. 11. After completing initialization as the FTP server, in S300 the CPU 34 enters a login wait state to wait for a client to login (see J1 of FIG. 4).

The CPU 34 remains in the login wait state while a login request has not been received from a client (S310: NO). When a login request has been received from a client (S310: YES), in S320 the CPU 34 executes a login sequence (see J2-J5 of FIG. 4).

If the login sequence failed (S330: NO), the CPU 34 once again enters the login wait state. However, if the login sequence was successful (S330: YES), then in S340 the CPU 34 transmits a code to the client indicating that login was successful (see J6 of FIG. 4) and enters a command wait state to wait for an FTP command from the client.

If a cd command was received from the client (S350: YES), then in S360 the CPU 34 executes a cd process in response to the cd command. If a list command was received from the client (S370: YES), then in S380 the CPU 34 executes a list process in response to the list command. If a get command was received from the client (S390: YES), then in S400 the CPU 34 executes a get process in response to the get command. If a put command was received from the client (S410: YES), then in S420 the CPU 34 executes a put process in response to the put command. If another command was received from the client, then in S430 the CPU. 34 executes a process corresponding to the another command.

After executing the above processes or if a command was not received from the client, in S440 the CPU 34 determines whether a shutdown process on the printer 80 or another indication to end the program has been received.

If no command has been given to end the program (S440: NO), then the CPU 34 reenters the command wait state. However, if a command has been issued to end the program (S440: YES), then in S450 the CPU 34 performs a shutdown process to end its function as the FTP server, thereby ending the normal operation process.

Next, the cd process, list process, get process, and put process will be described with reference to FIGS. 14 through 18. First, a process in S500, S600, S700, and S900 for creating virtual file data in each of the above respective processes will be described.

Figure 14:
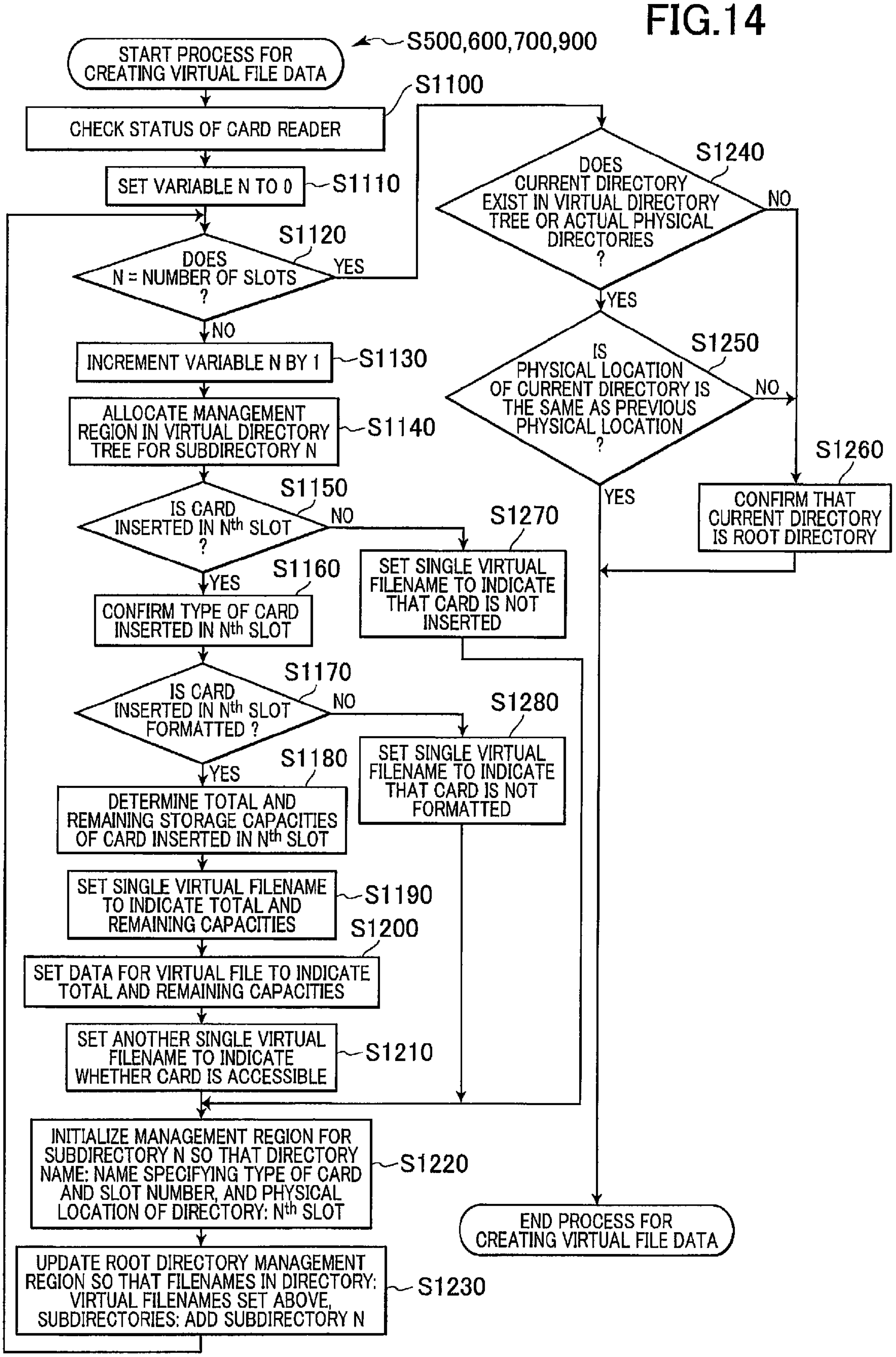
FIG. 14 is a flowchart illustrating steps in a process for creating virtual file data in the printer according to the embodiment.

FIG. 14 is a flowchart illustrating steps in the process for creating virtual file data in FIGS. 15-18.

In the process for creating virtual file data, the CPU 34 checks a device status of the printer 80 (including the status of the printer 80 as a device and the status of the printer 80 as an FTP server) and statuses of storage media connected to the printer 80, and sets the filenames and content of data reflecting these statuses. In other words, the CPU 34 performs a process to set the content of data for notifying the FTP client of the status on the FTP server.

In S1100 the CPU 34 checks the status of the printer 80. At this time, the CPU 34 acquires data related to the number of media connectors provided in the printer 80 and the types of storage media that can be connected to the media connectors.

In S1110 the CPU 34 sets a variable N to 0. The variable N is used in a program for confirming data for all media connectors. In S1120 the CPU 34 determines whether the variable N is equal to the number of media connectors. If the variable N is less than the number of media connectors (S1120: NO), in S1130 the CPU 34 increments the variable N by 1.

In S1140 the CPU 34 allocates a region in the virtual directory tree for managing a subdirectory N. The subdirectory N is used for virtually preparing a file used to reflect the status of the Nth media connector.

If storage media is connected to the Nth media connector (hereinafter referred to as media connector N; S1150: YES), in S1160 the CPU 34 confirms the type of storage media. In S1170 the CPU 34 determines whether the storage media connected to media connector N has been formatted.

If the storage media is formatted (S1170: YES), then in S1180 the CPU 34 determines a total storage capacity and a remaining storage capacity of the storage media connected to media connector N. In S1190 the CPU 34 sets a filename indicating the total storage capacity and remaining storage capacity of the storage media.

In S1200 the CPU 34 sets image data specifying the total storage capacity and remaining storage capacity of the storage media and recognizes this image data as physical data of a file having the filename specifying the total storage capacity and remaining storage capacity of the storage media.

In S1210 the CPU 34 sets another filename (status reflecting filename) indicating that this type of storage media can be accessed based on the type of storage media connected to media connector N.

On the other hand, if no storage media is connected to media connector N (S1150: NO), then in S1270 the CPU 34 sets a filename (status reflecting filename) indicating that no storage media is connected.

Further, if the storage media connected to media connector N has not been formatted (S1170: NO), then in S1280 the CPU 34 sets a filename (status reflecting filename) to indicate that the storage media is not formatted.

In S1220 the CPU 34 initializes the region for managing media connector N. Specifically, the CPU 34 sets attributes for a management region of the media connector N indicating that a directory name is a name specifying the type of storage media and a storage media number (slot number), and that a physical location of the directory exists on the storage media connected to storage unit N.

In S1230 the CPU 34 updates the management region of the root directory. Specifically, the CPU 34 adds the filename set in S1190, S1210, S1270, S1280, or the like as the name of a file existing in the directory, and adds the directory name stored in the management region for media connector N in S1220 as the directory name of a subdirectory existing in this root directory. Hence, the CPU 34 does not store a file in the storage media that is not intended to be stored by the owner of the media and, hence, does not perform an action disagreeable to the owner.

Next, the CPU 34 returns to S1120 and repeats the process described above from S1120 until determining that the process has been performed for all media connectors in the printer 80 (S1120: YES). If the process has been completed for all media connectors in the printer 80 (S1120: YES), then the CPU 34 exits this loop having confirmed the status for all media connectors.

In S1240 the CPU 34 determines whether the current directory exists in the virtual directory tree or actual physical directories. If the current directory exists in the virtual directory tree or the actual physical directories (S1240: YES), then in S1250 the CPU 34 determines whether a physical location of the current directory is the same physical location at the point when the virtual file data was created previously. (If the physical location is in storage media, an identifier or the like for the previous storage media can be stored and compared with the current storage media.)

If the physical location of the current directory is the same as the physical location at the point when the virtual file data was created previously (S1250: YES), the CPU 34 ends the process for creating the virtual file data.

However, it the CPU 34 determines in S1240 that the current directory does not exist in the virtual directory tree nor in the actual physical directories (S1240: NO) or if the CPU 34 determines in S150 that the physical location of the current directory is different from the previous physical location of the current directory (S1250: NO), then in S1260 the CPU 34 confirms that the current directory is the root directory and ends the virtual file data creation process.

Figure 15:
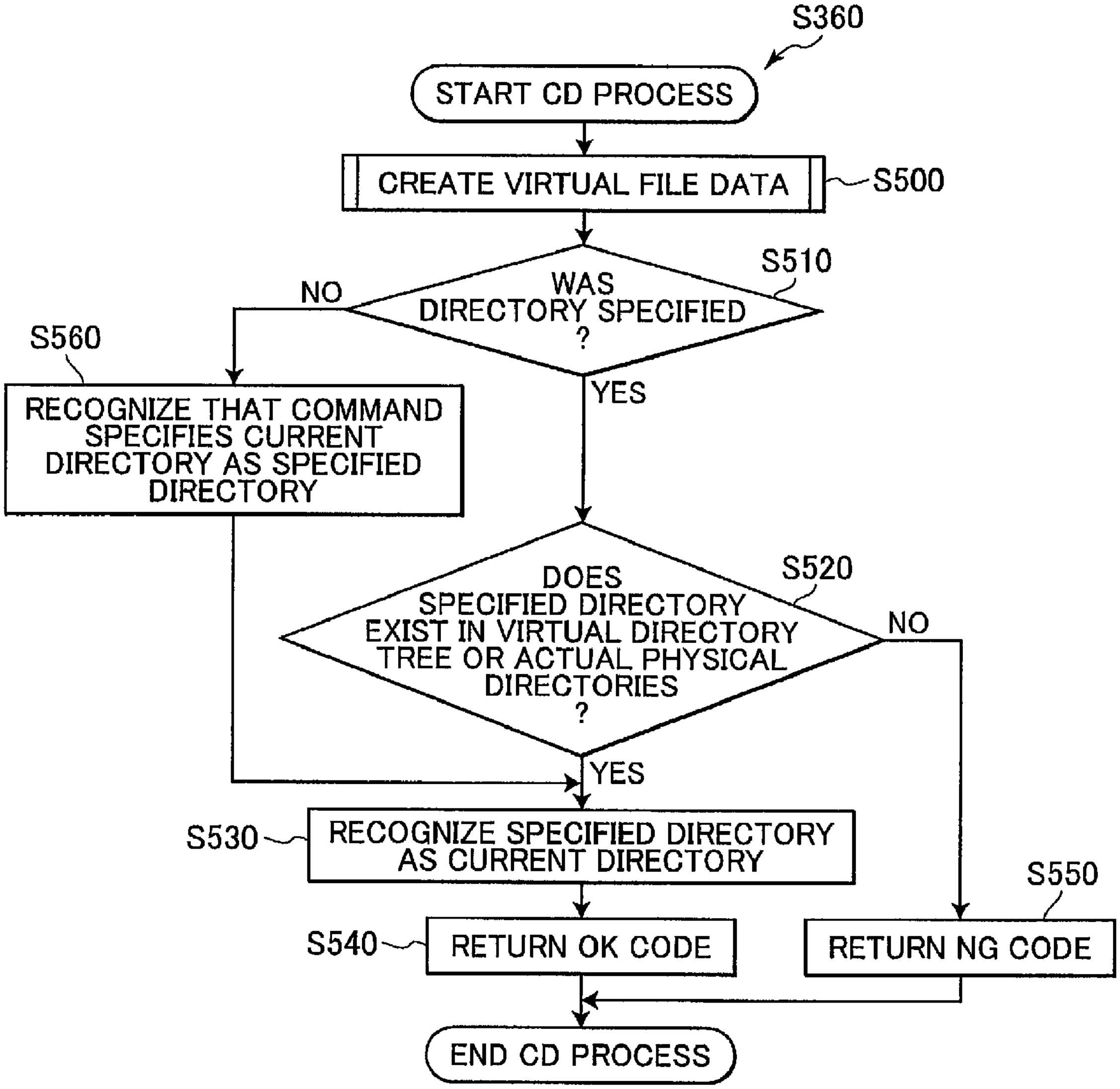
FIG. 15 is a flowchart illustrating steps in a cd process performed on the printer according to the embodiment.

FIG. 15 is a flowchart illustrating steps in the cd process of S360 in FIG. 12. The cd process functions to recognize the directory specified in the cd command as the current directory (i.e., to switch the current directory).

In S500 of the cd process the CPU 34 creates virtual file data as shown in FIG. 14 based on the current device status. In S510 the CPU 34 determines whether the command specifies a target directory. If a directory has been specified (S510: YES), then in S520 the CPU 34 determines whether the directory specified in the command received from the client exists in the virtual directory tree or in the actual physical directories (a storage media or other storage device).

If the specified directory exists in the virtual directory tree or in the actual physical directories (S520: YES), then in S530 the CPU 34 recognizes the specified directory as the current directory and in S540 transmits an OK code to the client indicating that the process was successful. Subsequently, the CPU 34 ends the cd process.

The directory specified in the cd command continues to be recognized as the current directory throughout the FTP server process unless the current directory is again switched.

However, if the specified directory does not exist in the virtual directory tree nor in the actual physical directories (S520: NO), in S550 the CPU 34 transmits a failure code (NG code) to the client indicating that the process failed, without changing the current directory to the specified directory. Subsequently, the ROM 35 ends the cd process.

Further, if the command does not specify a target directory (S510: NO), in S560 the CPU 34 recognizes that the command specifies the current directory as the specified directory and executes the process from S530.

Figure 16:
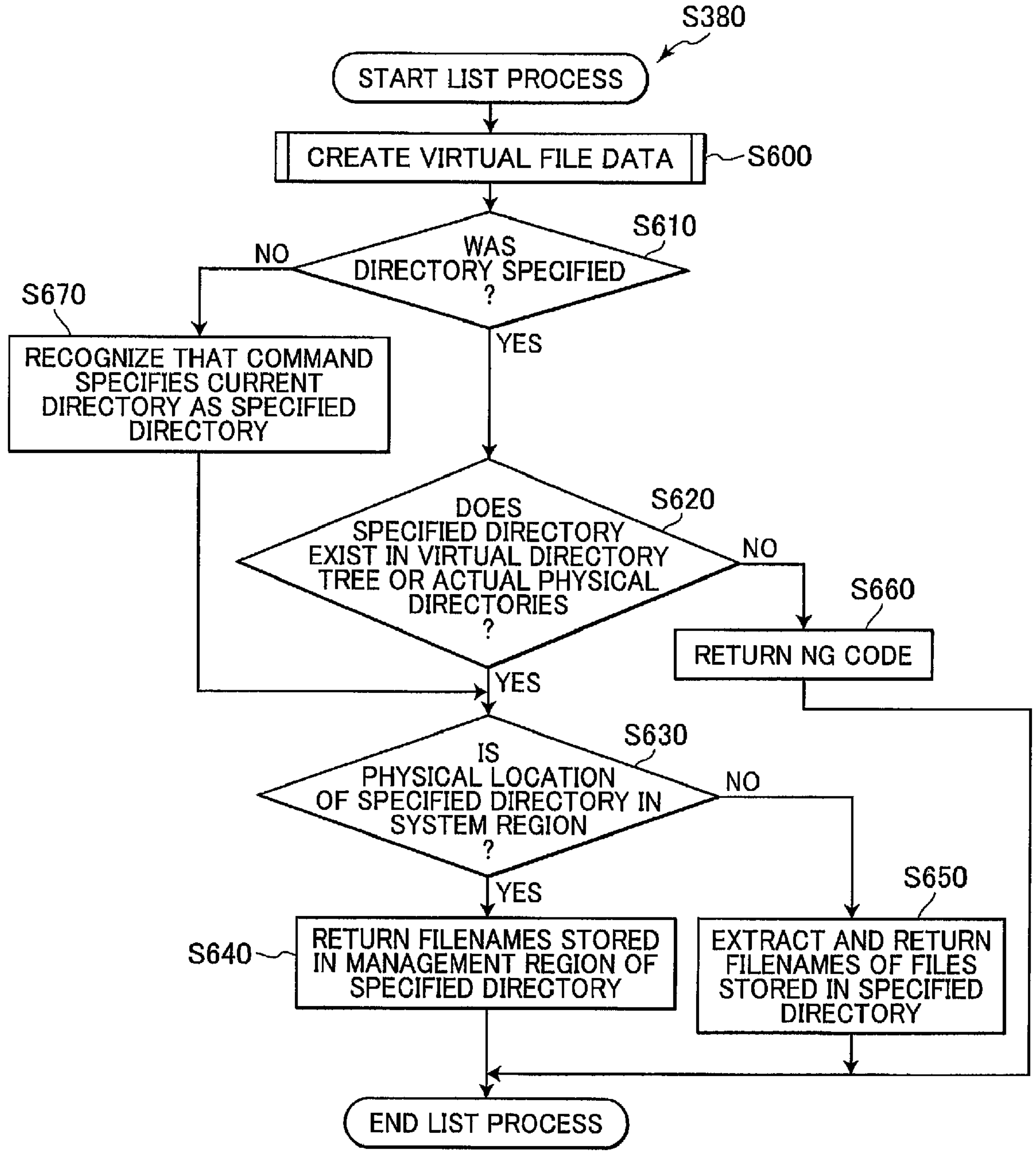
FIG. 16 is a flowchart illustrating steps in a list process performed on the printer according to the embodiment.

FIG. 16 is a flowchart illustrating steps in the list process of S380 in FIG. 12. The list process serves to return to the client filenames of files and directory names of directories (subdirectory names of subdirectories) located in the directory specified in the list command, i.e., to provide the client with a list of files and directories in the client-specified directory.

In S600 the CPU 34 creates the virtual file data as shown in FIG. 14 based on the current device status. In S610 the CPU 34 determines whether the command specifies a target directory. If a target directory is specified (S610: YES), then in S620 the CPU 34 determines whether the directory specified by the client in the command is in the virtual directory tree or in the actual physical directories.

If the specified directory is in the virtual directory tree or the actual physical directories (S620: YES), in S630 the CPU 34 determines whether the physical location of the specified directory exists in the system region. If the physical location of the specified directory is in the system region (the virtual directory tree) (S630: YES), then in S640 the CPU 34 transmits the filenames and subdirectory names stored in the region for managing the specified directory to the client and subsequently ends the list process. In other words, the CPU 34 transmits to the client filenames that are special in this embodiment, such as a filename indicating the status of the printer 80 and the storage media connected to the printer 80.

Figure 21:
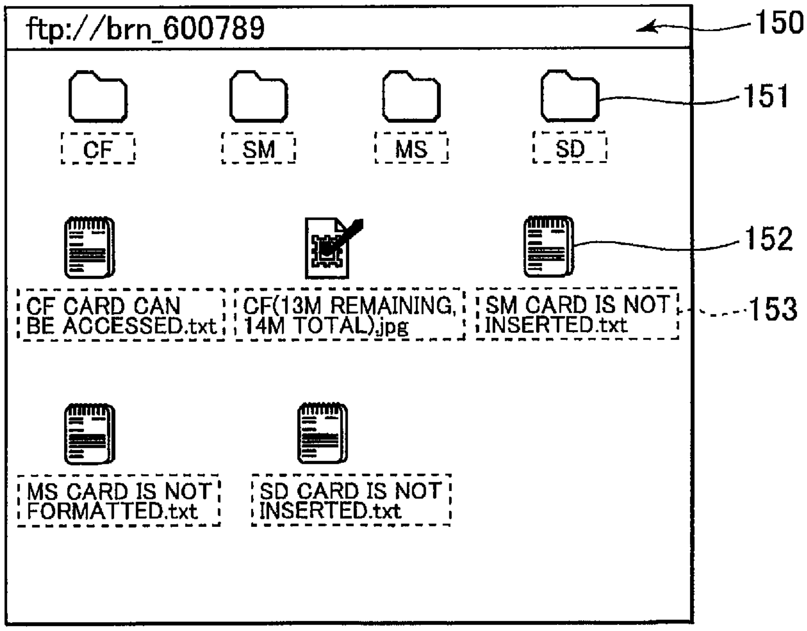
FIG. 21 is an explanatory diagram showing fourth icons of files displayed with status-reflecting filenames.

On the other hand, if the physical location of the specified directory is not in the system region, i.e., is in the storage media or other storage device (S630: NO), then in S650 the CPU 34 extracts and transmits the filenames and subdirectory names stored in the specified directory to the client, and subsequently ends the list process. In other words, the CPU 34 transmits filenames of the files and directory names of directories actually stored in the storage media or the like. If the client issues a list command for the root directory, the CPU 34 transmits filenames of the files and directory names of directories as shown in FIG. 21.

If the specified directory does not exist in the virtual directory tree nor in the actual physical directories (S620: NO), then in S660 the CPU 34 transmits a failure code to the client indicating that the process failed, and subsequently ends the list process.

Further, if the command does not specify the target directory (S610: NO), in S670 the CPU 34 recognizes that the command specifies the current directory as the specified directory and executes the process from S630.

Figure 17:
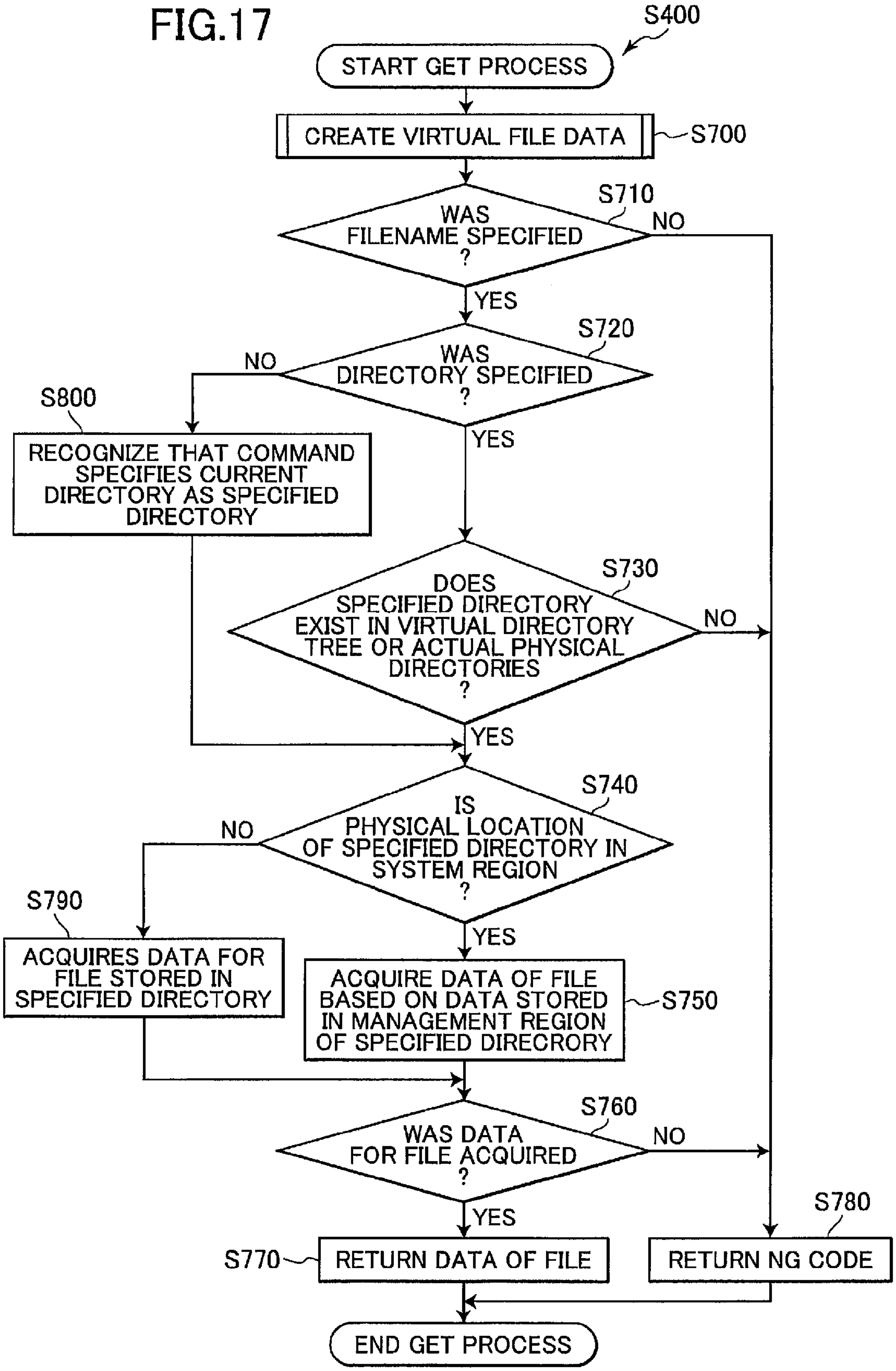
FIG. 17 is a flowchart illustrating steps in a get process performed on the printer according to the embodiment.

FIG. 17 is a flowchart illustrating steps in the get process of S400 in FIG. 12. The get process functions to return data for the file specified in a get command to the client, i.e., to provide the client with the data of the client-specified file.

In S700 of the get process, the CPU 34 creates the virtual file data as shown in FIG. 14 based on the current device status. In S710 the CPU 34 determines whether the command specifies a target file. If a target file is specified (S710: YES), in S720 the CPU 34 determines whether the command specifies the directory in which the target file exists (the location of the target directory).

If the command specifies the target directory (S720: YES), then in S730 the CPU 34 determines whether the directory specified by the client exists in the virtual directory tree or in the actual physical directories. If the specified directory exists in the virtual directory tree or in the actual physical directories (S730: YES), then in S740 the CPU 34 determines whether the physical location of the specified directory is within the system region (virtual directory tree).

If the physical location of the specified directory lies within the system region (S740: YES), then in S750 the CPU 34 acquires data of the file based on data stored in the region for managing the specified directory.

In S760 the CPU 34 determines whether the data of the file was acquired. If the data of the file could be acquired (S760: YES), in S770 the CPU 34 transmits the data to the client and subsequently ends the get process. In other words, the CPU 34 transmits data of a file special to this embodiment to the client, including a file indicating the status of the printer 80 and the statuses of storage media connected to the printer 80.

However, if data for the file could not be acquired (S760: NO), in S780 the CPU 34 transmits a failure code to the client indicating that the process failed, and subsequently ends the get process.

Further, if the CPU 34 determines in S740 that the physical location of the specified directory does not exist in the system region, i.e., is in the storage media or other storage device (actual physical directories) (S740: NO), in S790 the CPU 34 acquires data for the file stored in the specified directory and continues from S760 described above. In other words, the CPU 34 transmits the data for the files actually stored in the storage media.

Further, if the CPU 34 determines in S730 that the specified directory does not exist in the virtual directory tree nor in the actual physical directories (S730: NO), in S780 the CPU 34 transmits a failure code to the client indicating that the process failed, and subsequently ends the get process.

Further, if the CPU 34 determines in S720 that the command does not specify a target directory (S720: NO), in S800 the CPU 34 recognizes that the command specifies the current directory as the specified directory, and continues the process from S740.

Further, if the CPU 34 determines in S710 that the command does not specify a target file (S710: NO), in S780 the CPU 34 transmits a failure code to the client indicating that the process failed, and subsequently ends the get process.

Figure 18:
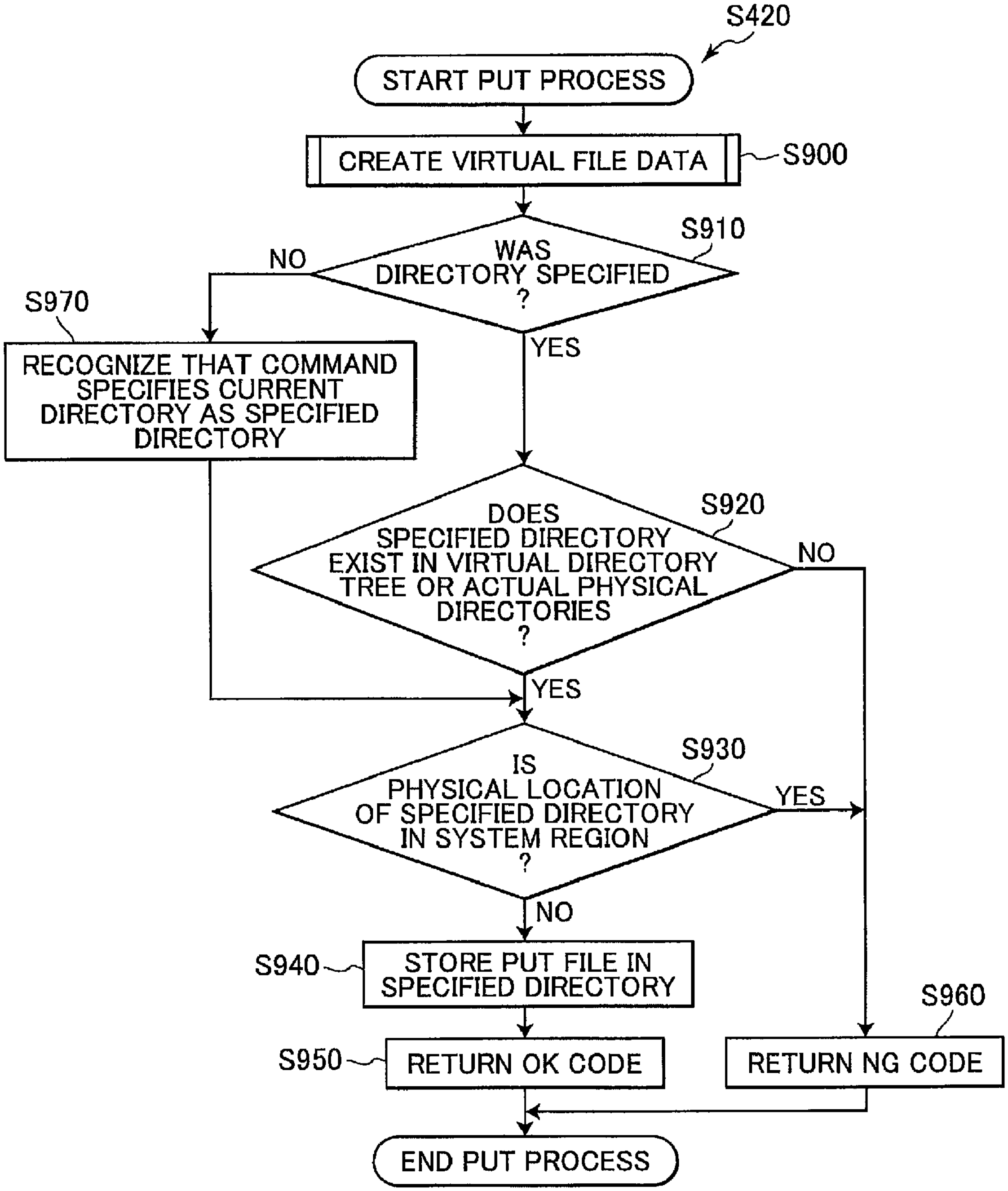
FIG. 18 is a flowchart illustrating steps in a put process performed on the printer according to the embodiment.

FIG. 18 is a flowchart illustrating steps in the put process of S420 in FIG. 12. The put process functions to store data for a file transmitted from the client in a put command in a storage device of the FTP server, i.e., to write data for the client-specified file to the FTP server.

In S900 of the put process the CPU 34 creates the virtual file data as shown in FIG. 14 based on the current device status. In S910 the CPU 34 determines whether the command specifies a directory (target directory) for storing the file. If the command does specify a target directory (S910: YES), then in S920 the CPU 34 determines whether the directory specified in the command exists in the virtual directory tree or in the actual physical directories.

If the specified directory does exist in the virtual directory tree or in the actual physical directories (S920: YES), in S930 the CPU 34 determines whether the physical location of the specified directory exists in the system region. If the physical location of the specified directory exists in the system region (virtual directory tree) (S930: YES), then in S960 the CPU 34 transmits a failure code to the client indicating that the process failed, and subsequently ends the put process. In other words, it is not possible to access the virtual directory provided for transmitting to the client a filename specifying the status of the printer 80 and the status of storage media connected to the printer 80. This process prevents a situation in which the user of the PC 3 believes to have written data for a file, although the data was not written because the directory is virtual.

However, if the physical location of the specified directory does not exist in the system region, i.e., is in a storage media or other storage device (actual physical directories) (S930: NO), then in S940 the CPU 34 stores the data in the specified directory, in S950 transmits an OK code to the client indicating that the process was successful, and subsequently ends the put process. Hence, the CPU 34 actually stores the data in the storage media or the like.

On the other hand, if the CPU 34 determines in S920 that the specified directory does not exist in the virtual directory tree nor in the actual physical directories (S920: NO), in S960 the CPU 34 transmits a failure code to the client indicating that the process failed and subsequently ends the put process.

Further, if the CPU 34 determines in S910 that the command does not specify a target directory (S910: NO), then in S970 the CPU 34 recognizes that the command specifies the current directory as the specified directory, and subsequently continues the process from S930.

Figure 19B:
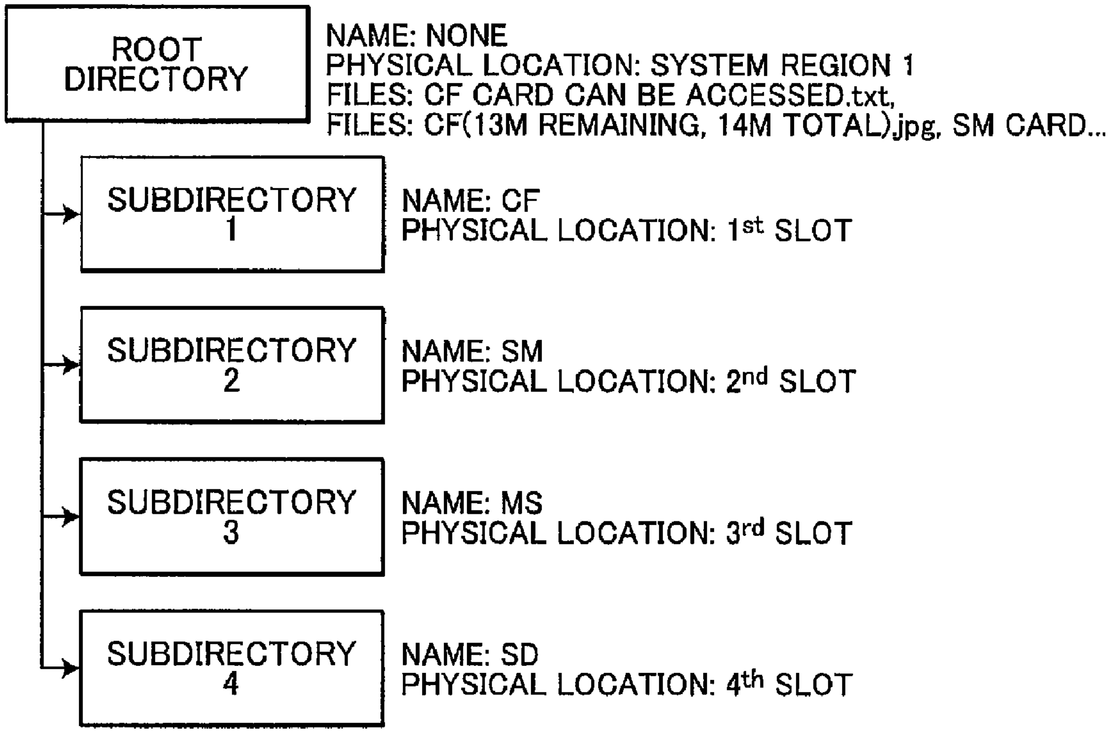
Figure 20:
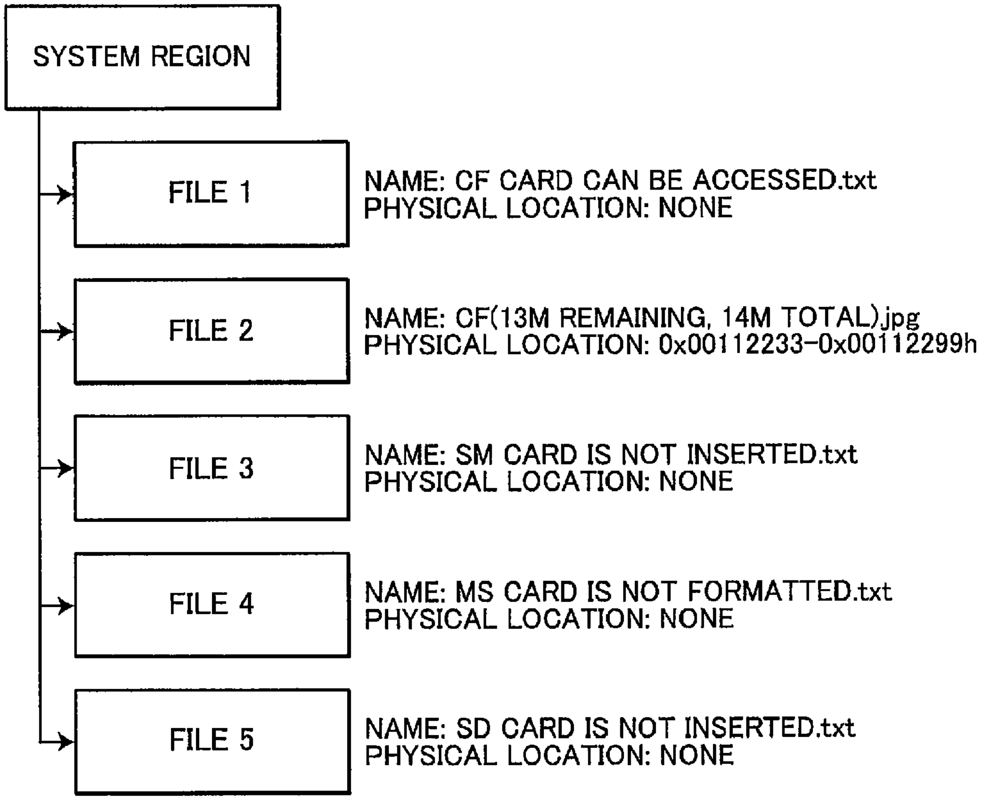
FIG. 20 is an explanatory diagram illustrating an example of a system region according to the embodiment.

FIGS. 19B, 20, and 21 show an example of the results obtained when executing the process shown in the flowcharts of FIGS. 11 through 18.

FIG. 19B is an explanatory diagram showing the virtual directory tree constructed according to the process for creating the virtual file data. FIG. 20 is an explanatory diagram showing a system region constructed according to the process for creating the virtual file data. FIG. 21 is a screen shot of a display shown on an FTP client.

In this example, the printer 80 has four media connectors to which the storage media CF, SM, MS, and SD can be connected. In this example, the CF and MS media are connected, while the MS is not formatted. The "physical location" of file 2 stores the memory address at which data is stored for a file having the filename "CF (13 M remaining, 14 M total).jpg".

As described above, when a command is received from an FTP client, the CPU 34 confirms the existence of a directory specified in the command. Next, by again recognizing that the current directory exists in the virtual directory tree, the CPU 34 can notify the FTP client that a filename specifying unconnected storage media exists in the root directory, even when the storage media has been removed from the printer 80.

Further, the CPU 34 acquires data related to the number of media connectors and the type of storage media that can be connected to the media connectors. Therefore, the CPU 34 can reflect an increase or decrease in media connectors in the printer 80, for example, in the status-reflecting filename or the status-reflecting data.

Further, by confirming the status of the printer 80 and the statuses of the storage media connected to media connectors in the printer 80, the CPU 34 can reflect changes in these statuses in the status-reflecting filename and status-reflecting data. The CPU 34 can also reflect the statuses of new storage media when such new storage media are connected to the media connectors.

In the above embodiment, data indicating the existence of the file with the status-reflecting filename (although it is not necessary for the file with the status-reflecting filename to exist) is transmitted to the PC 3, the status-reflecting filename indicating the status of the printer 80 or the status of storage media connected to a media connector of the printer 80. The PC 3 is provided with an FTP client program supporting the FTP protocol, and has a function for displaying at least the status-reflecting filename (naturally, an icon or the like may be displayed together with the status-reflecting filename) based on data transmitted from the FTP server. The user of the PC 3 (and the printer 80) can easily see the status of the printer 80 or the status of the storage media connected to the media connector by referencing the status-reflecting filename displayed on the PC 3.

In other words, the FTP system can notify the user in an easy-to-understand format regarding the connected status of the storage media in the printer 80, without expanding or modifying the FTP protocol.

According to the above embodiment, the CPU 34 can notify the user in straightforward manner regarding the status of the storage media, the formatted status of the storage media connected to the printer 80, the connected status of the storage media indicating whether the storage media is connected to the FTP processor, the type of media connector provided in the printer 80, and the type of storage media. Further, the CPU 34 can notify the user in straightforward manner regarding whether the storage media is in an accessible status.

Furthermore, according to the above embodiment, the CPU 34 transmits data to the PC 3 indicating the existence of a status-reflecting filename in a prescribed directory, even when the storage media storing the file is not connected. Accordingly, the PC 3 can display the status-reflecting filename (naturally an icon or the like may be displayed together with the status-reflecting filename) indicating either the status of the printer 80 or the status of the storage media connected to the media connector of the printer 80, even when the storage media is not connected to the printer 80. In other words, the printer 80 can notify the user of the PC 3 in an easy-to-understand manner regarding the connected status of the storage media on the printer 80, even though the storage media is not connected to the printer 80.

In the above embodiment, the PC 3 displays the file having the status-reflecting filename in a prescribed directory different from the directory of the storage media. Thus, the user can determine that the file with the status-reflecting filename is a status notification file unlike other files stored in the storage media. Therefore, the PC 3 can direct the user's attention to a filename indicating the status of the printer 80 or the status of the storage media connected to the media connector. Hence, this configuration can prevent the user from misunderstanding that the file with the status-reflecting filename is stored in the storage media or can avoid causing the user other worry that could lead to additional problems.

In the above embodiment, the CPU 34 transmits status-reflecting data indicating the status of the printer 80 or the status of the storage media connected to the media connector in response to a request to access the file having the status-reflecting filename. The status-reflecting data (FIG. 10) may hold data of a format not limited to the filename format. Accordingly, the source of the access request can display or analyze data indicating the status of the printer 80 or the status of the storage media connected to the media connector in a format containing more detailed data than the filename format and data that is easier to understand than the filename format, such as a diagram.

Specifically, notification in a format not limited to the filename format can be provided to the user of the device requesting access (and the printer 80) regarding the status of the printer 80 or the status of the storage media connected to the media connector.

More specifically, the PC 3 (FTP client) includes a function for receiving an access command from a user for accessing a displayed file and for transmitting an access request based on this command to the printer 80, and a function for displaying the content of the acquired file. Hence, the user can simply issue a command to access a file having a displayed status-reflecting filename using the more familiar user interface of the PC 3 in order to learn the status of the printer 80 or the status of the storage media connected to the media connector in a format not limited to the filename format. Image data indicating the remaining storage capacity of the storage media is one example of status-reflecting data.

In the above embodiment, the CPU 34 transmits to the PC 3 the status-reflecting filename that is capable of identifying the format of the status-reflecting data. There are a variety of data formats for files. By being able to identify the format of the status-reflecting data, the PC 3 can display or analyze the status of the printer 80 or the status of the storage media connected to the media connector according to a procedure suited to the format of the status-reflecting data. Common data formats are those indicated by the extensions .txt, .jpg, .pdf, .xls, and the like.

While the invention has been described in detail with reference to specific embodiments thereof, it would be apparent to those skilled in the art that many modifications and variations may be made therein without departing from the spirit of the invention, the scope of which is defined by the attached claims.

For example, while the present invention is applied to an printer 80 capable of having a plurality of media connectors in the embodiment described above, the present invention may be applied to a device having a single media connector.

Further, while subdirectories are provided as physical locations of storage media connected to each of the plurality of media connectors in the above embodiment, it is also possible to provide a subdirectory only for storage media connected to a single media connector (see FIGS. 6 through 9).

Further, while the content of the status-reflecting filename and status-reflecting data is set under the condition that a command has been received from the PC 3 (FTP client) in the preferred embodiment, this content may be determined when the PC 3 (FTP client) is started up or at regular intervals.

In the example of the above embodiment, a filename specifying the connected statuses of storage media is provided separately from another filename specifying the storage capacity of the storage media. However, a single filename may include both a character string specifying the connected statuses of the storage media and a character string specifying the storage capacity of the storage media. Naturally, the filename may also include character strings specifying other statuses.

Further, in S1240-S1260 of FIG. 14, the CPU 34 confirms whether the physical location of the current directory has changed. However, as shown in FIG. 22, the CPU 34 may confirm whether storage media at which the actual physical directory of the current directory exists has been connected or disconnected and whether the number of media connectors has increased or decreased, and may set the root directory as the current directory when the actual physical directory of the current directory no longer exists.

Figure 22:
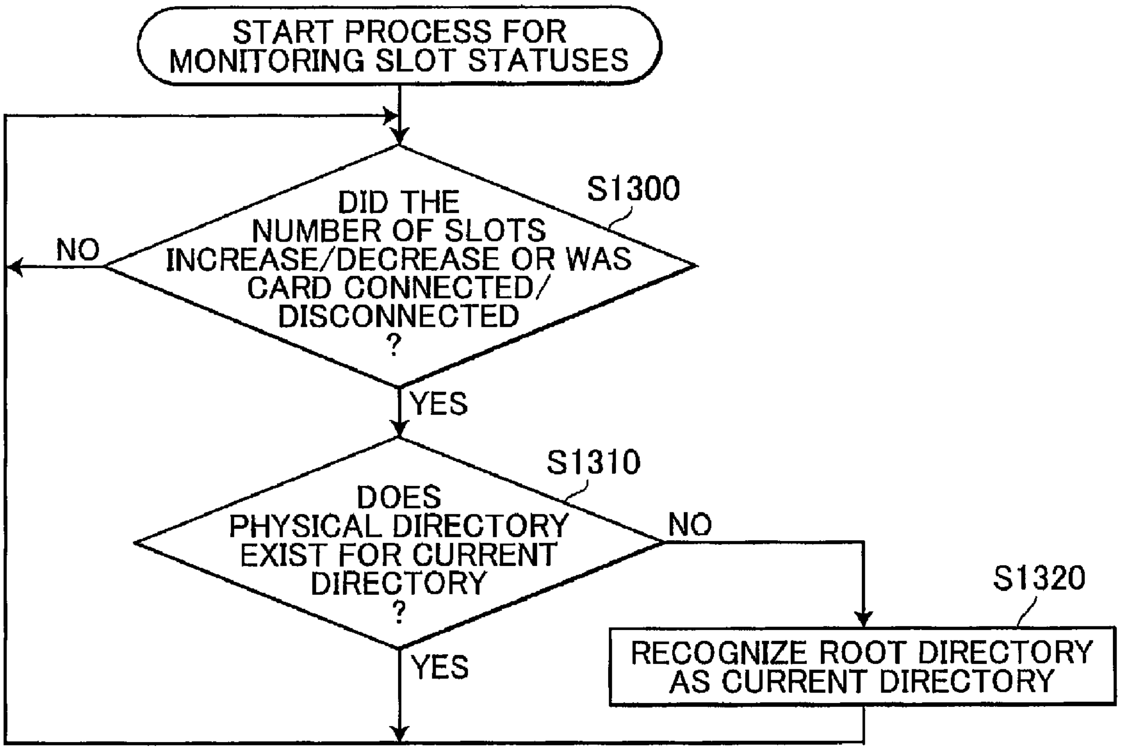
FIG. 22 is a flowchart illustrating steps in a process for monitoring the statuses of slots performed on the printer according to the embodiment.

In a process of monitoring the statuses of slots shown in FIG. 22, in S1300 the CPU 34 determines whether the number of slots has increased or decreased or whether a card was connected or disconnected. If the number of slots has changed or a card has been connected or disconnected (S1300: YES), in S1310 the CPU 34 confirms whether the actual physical directory of the current directory exists, i.e., whether the card in which the actual physical directory existed was disconnected or whether a slot to which this card was connected has been removed.

If the actual physical directory of the current directory no longer exists (S1310: NO), in S1320 the CPU 34 recognizes the root directory as the current directory. The process for monitoring the status of slots in FIG. 22 is continually executed as a resident program while the FTP server is operating.

Further, while the actual physical directory is located in storage media in the above embodiment, as in the conventional FTP server device, the printer 80 is configured of other storage devices, such as memory and a hard disk drive. Therefore, the actual physical directory may be located in such storage devices.

Further, while the connected statuses of the storage media is given as an example of the device status of the printer 80, the device status of the printer 80 may be treated as a status other than when the printer 80 functions as an FTP processing device, such as the status when the printer 80 functions as a printing device, a scanning device, or a facsimile device, and this device status may be reflected in the status-reflecting filename and the status-reflecting data. For example, the status may indicate whether the printer 80 is able to print, whether the printer 80 is able to scan, or whether the printer 80 is able to transmit a fax.

Further, while the printer 80 is specified as an example of the FTP processing device, it should be apparent that the present invention may be applied to any device configured of having media connectors and having an FTP server function, such as a scanning device, a display device, an audio device, a karaoke device, a digital camera, a projector, a disc drive, a sewing machine, a telephone, a mobile device, a machine tool, or a robot.

Still further, while the printer 80 is specified as an example of the FTP processing device, it should be apparent that the present invention may be applied to any other communication protocol which is configured to transfer filenames.

What is claimed is:

1. A status processor communicable with a host device via a network and with a storage media, the processor comprising:

a media connecting unit that is configured to connect to the storage media;

a status-reflecting filename setting unit that sets a status-reflecting filename of a file corresponding to a status of the storage media;

a server unit that transmits data indicating an existence of the file having the status-reflecting filename to the host device; and a storing portion which stores directory data indicating a prescribed directory, the prescribed directory being treated to include the file having the status-reflecting filename, the server unit transmits the data indicating the existence of the file to the host device, the file having the status-reflecting filename, if the host device requests a content of the prescribed directory, and wherein the status-reflecting filename setting unit sets the status-reflecting filename without storing the file having the status-reflecting filename in the storage media, wherein an FTP is used for communication between the server unit and the host unit and displaying the data on a displaying unit of the host device.

2. The status processor according to claim 1, wherein the status-reflecting filename setting unit sets the status-reflecting filename indicating whether the storage media is available.

3. The status processor according to claim 2, wherein the status-reflecting filename setting unit sets the status-reflecting filename indicating a connecting status of the storage medium to the media connecting unit.

4. The status processor according to claim 2, wherein the status-reflecting filename setting unit sets the status-reflecting filename indicating a format status of the storage media.

5. The status processor according to claim 1, wherein the status-reflecting filename setting unit sets the status-reflecting filename indicating a capacity of the storage media.

6. The status processor according to claim 5, wherein the capacity of the storage media includes a total capacity of the storage media and a remaining capacity of the storage media.

7. The status processor according to claim 1, wherein the media connecting unit comprises a plurality of media connecting portions, wherein the status-reflecting filename setting unit sets the status-reflecting filename indicating a status of one of the plurality of media connecting portions or a status of the storage medium connected to one of the plurality of media connecting portions.

8. The status processor according to claim 1, wherein the media connecting unit is capable of connecting a plurality of types of storage media, and wherein the status-reflecting filename setting unit sets the status-reflecting filename specifying one type of the plurality of types of storage media.

9. The status processor according to claim 1, further comprising a status-reflecting data setting unit that sets status-reflecting data corresponding to a status of the processor or the storage media and corresponding to the status-reflecting filename, wherein the server unit transmits the status-reflecting data to the host device in response to a request for accessing to the file having the status-reflecting filename.

10. The status processor according to claim 9, wherein the status-reflecting filename setting unit sets the status-reflecting filename identifying a format of the status-reflecting data.

11. The status processor according to claim 1, further comprising a receiving unit that receives print data transmitted via the network; and a printing unit that prints the print data.

12. A status processing system comprising:

a host device comprising a displaying unit; and a processor that is communicable with the host device via a network, the processor comprising:

a media connecting unit that is configured to connect to a storage media;

a status-reflecting filename setting unit that sets a status-reflecting filename of a file corresponding to a status of the storage media;

a server unit that transmits data indicating an existence of the file having the status-reflecting filename to the host device; and a storing portion which stores directory data indicating a prescribed directory, the prescribed directory being treated to include the file having the status-reflecting filename, wherein the server unit transmits the data indicating the existence of the file to the host device, the file having the status-reflecting filename, if the host device requests a content of the prescribed directory, wherein the status-reflecting filename setting unit sets the status-reflecting filename without storing a file having the status-reflecting filename in the storage media, and wherein an FTP is used for communication between the server unit and the host unit and displaying the data on the displaying unit.

13. A status displaying method using a host device and a processor communicable with the host device via a network, the host device comprising a display unit, the processor comprising a media connecting unit that is configured to connect to a storage media, the status displaying method comprising:

setting a status-reflecting filename in the processor, corresponding to a status of the storage media without storing a file having the status-reflecting filename in the storage media;

storing directory data in the processor, indicating a prescribed directory, the prescribed directory including a file having the status-reflecting filename;

transmitting data by the processor, indicating an existence of the file having the status-reflecting filename to the host device, the file having the status-reflecting filename, if the host device requests a content of the prescribed directory, wherein an FTP is used for communication between the server unit and the host unit; and displaying the data on the displaying unit.

* * * * *